(12) United States Patent
Urban et al.

(10) Patent No.: US 12,355,974 B2
(45) Date of Patent: Jul. 8, 2025

(54) MOTION VECTOR DERIVATION IN VIDEO ENCODING AND DECODING

(71) Applicant: INTERDIGITAL CE PATENT HOLDINGS, SAS, Paris (FR)

(72) Inventors: Fabrice Urban, Thorigne Fouillard (FR); Franck Galpin, Thorigne-Fouillard (FR); Philippe Bordes, Laille (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/423,086

(22) Filed: Jan. 25, 2024

(65) Prior Publication Data

US 2024/0171750 A1 May 23, 2024

Related U.S. Application Data

(63) Continuation of application No. 17/428,359, filed as application No. PCT/IB2020/000290 on Mar. 6, 2020, now Pat. No. 11,930,184.

(30) Foreign Application Priority Data

Mar. 8, 2019 (EP) .................... 19305272

(51) Int. Cl.
 *H04N 19/137* (2014.01)
 *H04N 19/172* (2014.01)
 (Continued)

(52) U.S. Cl.
 CPC ......... *H04N 19/137* (2014.11); *H04N 19/172* (2014.11); *H04N 19/513* (2014.11); *H04N 19/70* (2014.11)

(58) Field of Classification Search
 CPC ...... H04N 19/52; H04N 19/56; H04N 19/523; H04N 19/82; H04N 19/577
 See application file for complete search history.

(56) References Cited

U.S. PATENT DOCUMENTS

2006/0256866 A1 11/2006 Ziauddin et al.
2013/0182768 A1 7/2013 Jeong et al.
(Continued)

FOREIGN PATENT DOCUMENTS

| CN | 109417630 A | 3/2019 |
|---|---|---|
| TW | 2019-04299 A | 1/2019 |
| WO | 2018/121506 A1 | 7/2018 |

OTHER PUBLICATIONS

Badnerkar et al., "Motion Sensed Video Storage Algorithm for Surveillance Recording", 12th International Conference on Hybrid Intelligent Systems, IEEE, Dec. 2012, 4 pages.
(Continued)

*Primary Examiner* — Fabio S Lima
(74) *Attorney, Agent, or Firm* — Condo Roccia Koptiw LLP

(57) ABSTRACT

Video processing can involve encoding and/or decoding a picture based on determining an activation of a processing mode involving a motion vector refinement process and a second process other than the motion vector refinement process; modifying the motion vector refinement process based on the activation and the second process; and encoding and/or decoding the picture based on the modified motion vector refinement process and the second process.

20 Claims, 19 Drawing Sheets

(51) Int. Cl.
*H04N 19/513* (2014.01)
*H04N 19/70* (2014.01)

(56) References Cited

U.S. PATENT DOCUMENTS

| | | |
|---|---|---|
| 2016/0156367 A1 | 6/2016 | Kalevo et al. |
| 2018/0199057 A1 | 7/2018 | Chuang et al. |
| 2018/0241998 A1 | 8/2018 | Chen et al. |
| 2018/0249154 A1 | 8/2018 | Chuang et al. |
| 2019/0020895 A1 | 1/2019 | Liu et al. |
| 2019/0208223 A1 | 7/2019 | Galpin et al. |
| 2020/0221116 A1 | 7/2020 | Chen et al. |
| 2021/0227209 A1 | 7/2021 | Liu et al. |
| 2021/0227250 A1 | 7/2021 | Liu et al. |

OTHER PUBLICATIONS

Chen et al., "Algorithm Description for Versatile Video Coding and Test Model 4 (VTM 4)", JVET-M1002-v1, Editors, Jot Video Experts Team JVET) of ITU-T SG 16 WP 3 and ISO/IEC JTC 1/SC 29/WG 11, 13th Meeting: Marrakech, MA, Jan. 9-18, 2019, 60 pages.

Chen et al., "Algorithm Description of Joint Exploration Test Model 7 (JEM 7)", JVET-G1001-V1, Editors, Joint Video Exploration Team (JVET) of ITU-T SG 16 WP 3 and ISO/IEC JTC 1/SC 29/WG 11, 7th Meeting: Torino, IT, Jul. 13-21, 2017, 48 pages.

Esenlik et al., "CE9: DMVR with Motion Vector Difference Mirroring (Test 1.6)", JVET-K0216-v3, Huawei Technologies Co. Ltd., Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-5.

ITU-T, "High Efficiency Video Coding", Recommendation ITU-T H.265, Series H: Audiovisual and Multimedia Systems, Infrastructure of Audiovisual Services—Coding of Moving Video, Apr. 2015, 636 pages.

Abe et al., "CE4-Related: Low Pipeline Latency LIC", JVET-L0120-V2, Joint Video Exploration Team (JVET) of ITU-T SG 16 WP 3 and ISO/IEC JTC 1/SC 29/WG 11, 12th Meeting: Macao, China, Oct. 3, 2018, 5 pages.

Example of decoding side motion vector refinement (DMVR)

Example of DMVR searching procedure

Example of DMVR Integer luma sample searching pattern

Example of LIC parameters being derived from neighboring reconstructed samples & the corresponding reference samples translated with MV (upper: square CU; lower: rectangle CU)

Example of Derivation of LIC parameters & application for each prediction L0 and L1

Example of Derivation of LIC parameters and application to the combined prediction from L0 and L1.

Examples of position of left and top reference samples for rectangular CUs

Example of Bi prediction with DMVR and LIC

Example of derivation of the LIC parameters based on the decoded bi-prediction motion vectors before the DMVR refinement

Example of Bi prediction with DMVR and WP

MOTION VECTOR DERIVATION IN VIDEO ENCODING AND DECODING

CROSS REFERENCE TO RELATED APPLICATIONS

This application is a continuation application of U.S. Non-Provisional application Ser. No. 17/428,359, filed Aug. 4, 2021, which is a 35 U.S.C. § 371 National Stage of Patent Cooperation Treaty Application PCT/IB2020/000290, filed Mar. 6, 2020, which claims the priority to European Patent Application No. 19305272.7 filed Mar. 8, 2019, the contents of all of which are hereby incorporated herein by reference in their entireties.

TECHNICAL FIELD

The present disclosure involves video encoding and decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original picture block and the predicted picture block, often denoted as prediction errors or prediction residuals, are transformed, quantized and entropy coded. To reconstruct the video, the compressed data is decoded by inverse processes corresponding to the prediction, transform, quantization and entropy coding.

SUMMARY

At least one example of an embodiment is provided involving a method for encoding picture information, comprising: determining activation of a decoder-side motion vector refinement process including a refinement function; modifying the refinement function based on an indicator; and encoding at least a portion of the picture information based on the decoder-side motion vector refinement process and the modified refinement function.

At least one example of an embodiment is provided involving a method for decoding picture information, comprising: determining activation of a decoder-side motion vector refinement process including a refinement function; modifying the refinement function based on an indicator; and decoding at least a portion of the picture information based on the decoder-side motion vector refinement process and the modified refinement function.

At least one example of an embodiment is provided involving apparatus for encoding picture information, comprising: one or more processors configured to determine activation of a decoder-side motion vector refinement process including a refinement function; modify the refinement function based on an indicator; and encode at least a portion of the picture information based on the decoder-side motion vector refinement process and the modified refinement function.

At least one example of an embodiment is provided involving apparatus for decoding picture information, comprising: one or more processors configured to determine activation of a decoder-side motion vector refinement process including a refinement function; modify the refinement function based on an indicator; and encode at least a portion of the picture information based on the decoder-side motion vector refinement process and the modified refinement function.

At least one example of an embodiment is provided involving a method for encoding picture information, comprising: determining activation of processing mode involving a motion vector refinement process and a motion vector refinement function; modifying the motion vector refinement process based on the motion vector refinement function; and encoding at least a portion of the picture information based on the processing mode and the modified motion vector refinement process.

At least one example of an embodiment is provided involving a method for decoding picture information, comprising: determining an activation of a processing mode involving a motion vector refinement process and a motion vector refinement function; modifying the motion vector refinement process based on the motion vector refinement function; and decoding at least a portion of the picture information based on the processing mode and the modified motion vector refinement process.

At least one example of an embodiment is provided involving apparatus for encoding picture information, comprising: one or more processors configured to determine an activation of a processing mode involving a motion vector refinement process and a motion vector refinement function; modify the motion vector refinement process based on the motion vector refinement function; and encode at least a portion of the picture information based on the processing mode and the modified motion vector refinement process.

At least one example of an embodiment is provided involving apparatus for decoding picture information, comprising: one or more processors configured to determine an activation of a processing mode involving a motion vector refinement process and a motion vector refinement function; modify the motion vector refinement process based on the motion vector refinement function; and decode the picture based on the modified motion vector refinement process.

At least one example of an embodiment is provided involving a method for encoding a picture comprising determining an activation of a processing mode involving a motion vector refinement process and a second process other than the motion vector refinement process; modifying the motion vector refinement process based on the activation and the second process; and encoding the picture based on the modified motion vector refinement process and the second process.

At least one other example of an embodiment is provided involving a method for decoding a picture comprising determining an activation of a processing mode involving a motion vector refinement process and a second process other than the motion vector refinement process; modifying the motion vector refinement process based on the activation and the second process; and decoding the picture based on the modified motion vector refinement process and the second process.

At least one other example of an embodiment is provided involving an apparatus for encoding a picture, comprising one or more processors, wherein the one or more processors are configured to: determine an activation of a processing mode involving a motion vector refinement process and a second process other than the motion vector refinement process; modify the motion vector refinement process based on the activation and the second process; and encode the picture based on the modified motion vector refinement process and the second process.

At least one other example of an embodiment is provided involving an apparatus for decoding a picture, comprising one or more processors, wherein the one or more processors are configured to: determine an activation of a processing mode involving a motion vector refinement process and a second process other than the motion vector refinement process; modify the motion vector refinement process based on the activation and the second process; and decode the picture based on the modified motion vector refinement process and the second process.

At least one other example of an embodiment is provided involving a method for encoding a picture, comprising: determining an activation of a processing mode involving a decoder side motion vector refinement (DMVR) process and a local illumination compensation (LIC) process; modifying the DMVR process based on the activation and the LIC process; and encoding the picture based on the modified DMVR process and the LIC process.

At least one other example of an embodiment is provided involving a method for decoding a picture, comprising: determining an activation of a processing mode involving a decoder side motion vector refinement (DMVR) process and a local illumination compensation (LIC) process; modifying the DMVR process based on the activation and the LIC process; and decoding the picture based on the modified DMVR process and the LIC process.

At least one other example of an embodiment is provided involving an apparatus for encoding a picture, comprising one or more processors, wherein the one or more processors are configured to: determine an activation of a processing mode involving a decoder side motion vector refinement (DMVR) process and a local illumination compensation (LIC) process; modify the DMVR process based on the activation and the LIC process; and encode the picture based on the modified DMVR process and the LIC process.

At least one other example of an embodiment is provided involving an apparatus for decoding a picture, comprising one or more processors, wherein the one or more processors are configured to: determine an activation of a processing mode involving a decoder side motion vector refinement (DMVR) process and a local illumination compensation (LIC) process; modify the DMVR process based on the activation and the LIC process; and decode the picture based on the modified DMVR process and the LIC process.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWINGS

The present disclosure may be better understood by considering the detailed description below in conjunction with the accompanying figures, in which.

It should be understood that the drawings are for purposes of illustrating examples of various aspects, features and embodiments in accordance with the present disclosure and are not necessarily the only possible configurations. Throughout the various figures, like reference designators refer to the same or similar features.

DETAILED DESCRIPTION

Figure 1:
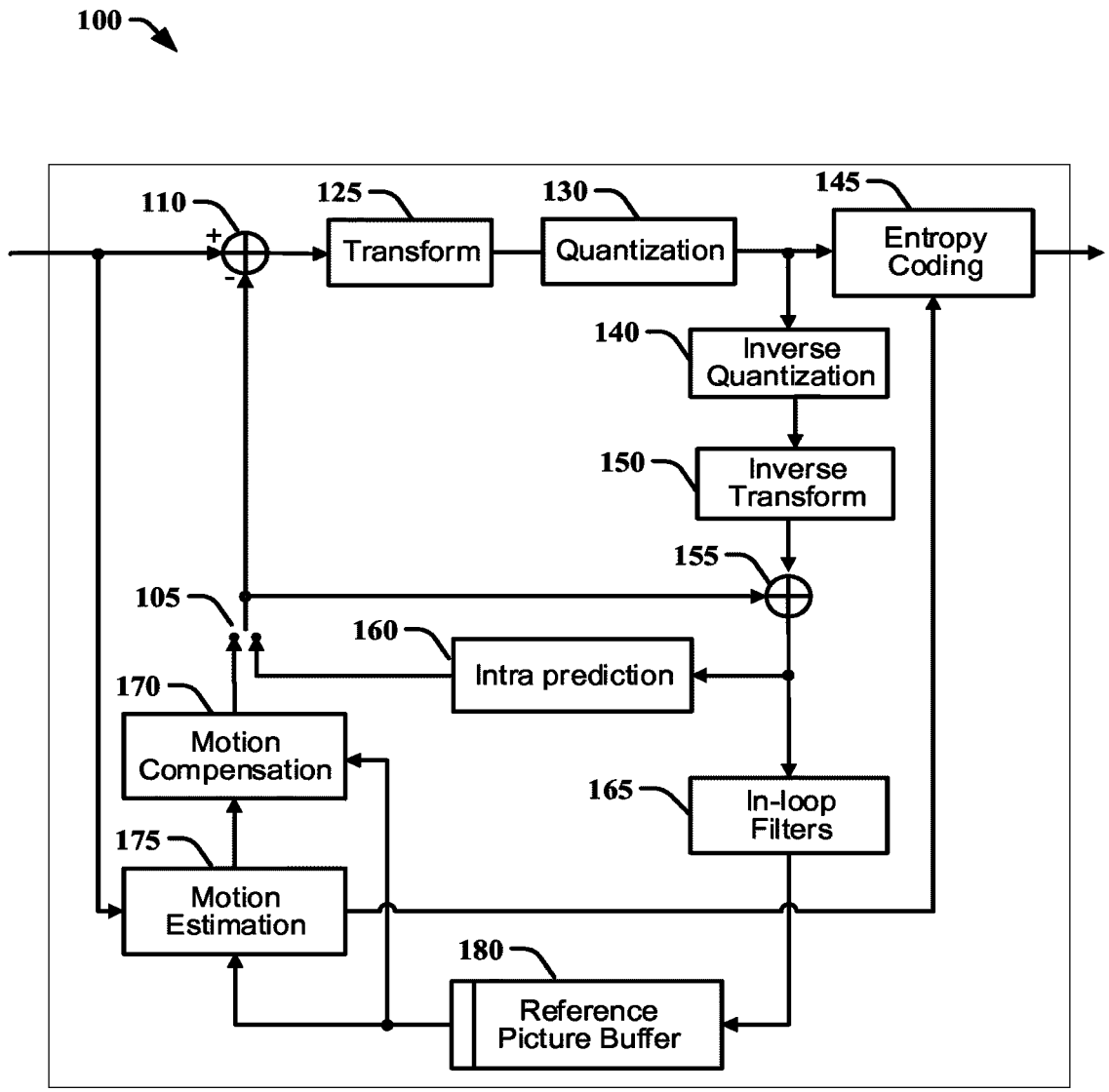
FIG. 1 provides a block diagram depicting an example of an embodiment of a video encoder.

Turning now to the figures, FIG. 1 illustrates an example of a video encoder 100, such as an HEVC encoder. HEVC is a compression standard developed by Joint Collaborative Team on Video Coding (JCT-VC) (see, e.g., "ITU-T H.265 TELECOMMUNICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265"). FIG. 1 may also illustrate an encoder in which improvements are made to the HEVC standard or an encoder employing technologies similar to HEVC, such as an encoder based on or improved upon JEM (Joint Exploration Model) under development by the Joint Video Experts Team (JVET), e.g., that associated with the development effort designated Versatile Video Coding (VVC).

In the present application, the terms "reconstructed" and "decoded" may be used interchangeably, the terms "pixel" and "sample" may be used interchangeably, and the terms "picture" and "frame" may be used interchangeably. Usually, but not necessarily, the term "reconstructed" is used at the encoder side while "decoded" is used at the decoder side.

The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU. In the present application, the term "block" can be used to refer to any of CTU, CU, PU, TU, CB, PB and TB. In addition, the "block" can also be used to refer to a macroblock and a partition as specified in H.264/AVC or other video coding standards, and more generally to refer to an array of data of various sizes.

In encoder 100 in FIG. 1, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
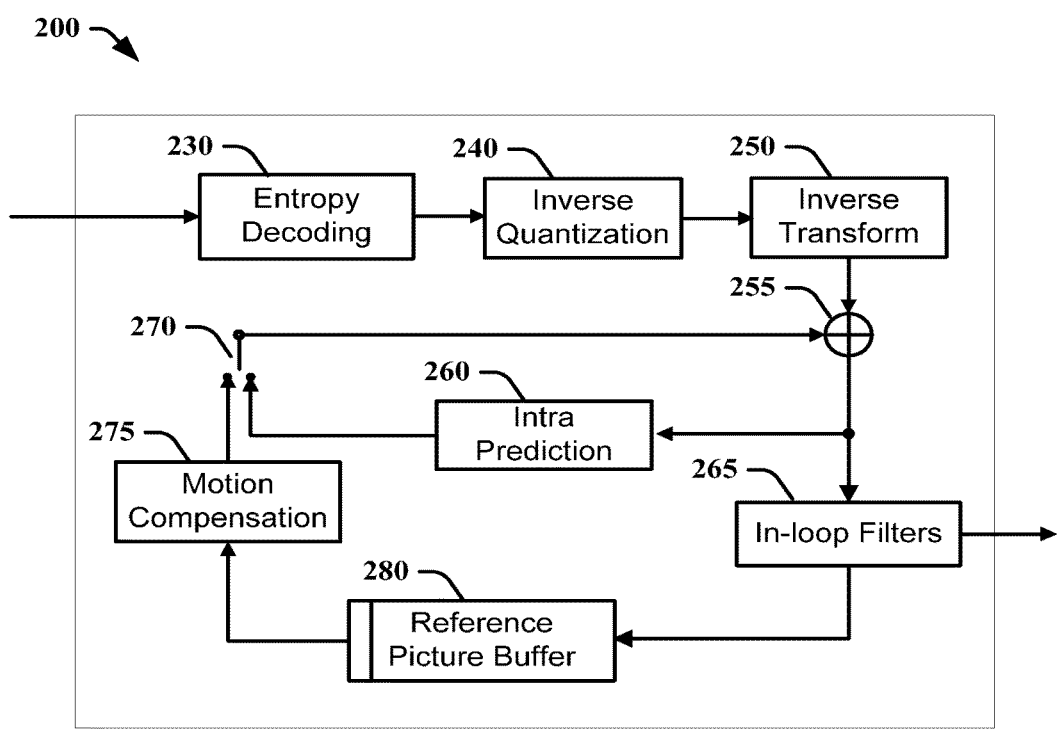
FIG. 2 provides a block diagram depicting an example of an embodiment of a video decoder.

FIG. 2 illustrates a block diagram of an example of a video decoder 200, such as an HEVC decoder. In the example decoder 200, a signal or bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a decoder based on or improved upon JEM.

In particular, the input of the decoder includes a video signal or bitstream that can be generated by a video encoder such as video encoder 100 of FIG. 1. The signal or bitstream is first entropy decoded (230) to obtain transform coefficients, motion vectors, and other coded information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). Advanced Motion Vector Prediction (AMVP) and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

Figure 3:
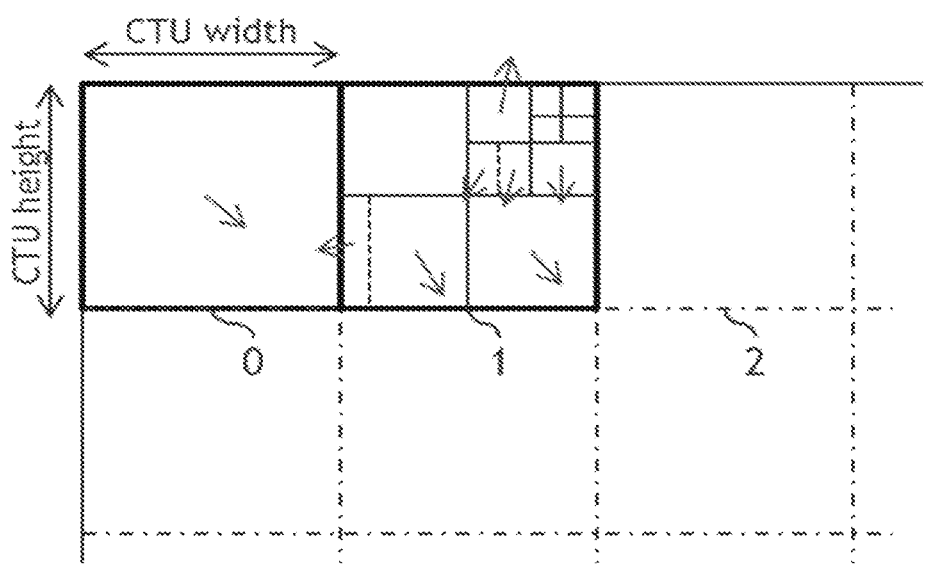
FIG. 3 illustrates aspects of the present disclosure involving a Coding Tree Unit (CTU)

In the HEVC video compression standard, motion compensated temporal prediction is employed to exploit the redundancy that exists between successive pictures of a video. To do so, a motion vector is associated to each prediction unit (PU). Each Coding Tree Unit (CTU) is represented by a Coding Tree (CT) in the compressed domain. This is a quad-tree division of the CTU, where each leaf is called a Coding Unit (CU) as illustrated in FIG. 3.

Figure 4:
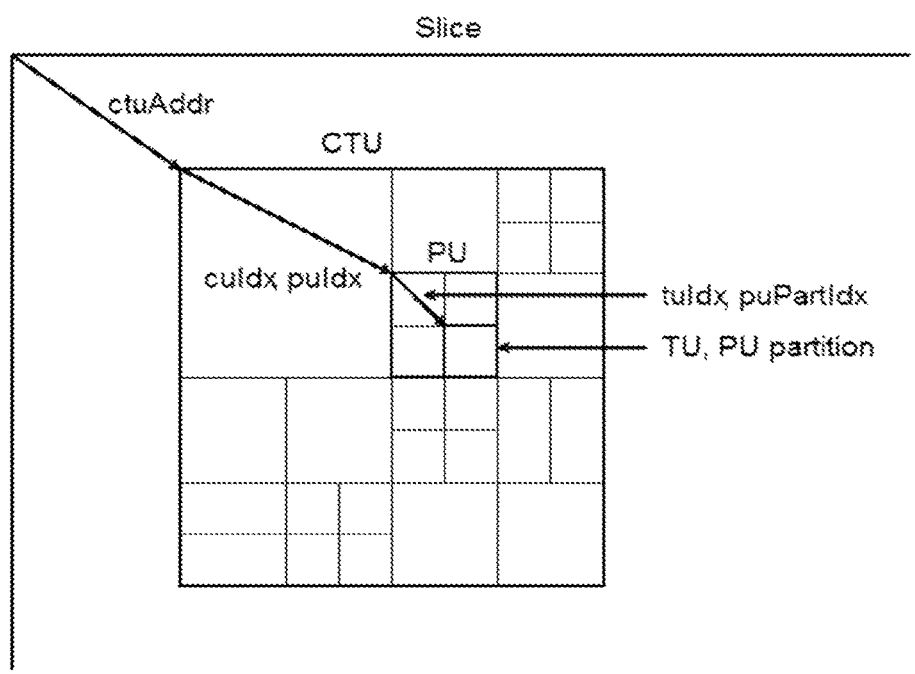
FIG. 4 illustrates aspects of the present disclosure involving a CTU and Coding Unit (CU)

Each CU is then given some Intra or Inter prediction parameters (Prediction Info). To do so, it is spatially partitioned into one or more Prediction Units (PUs), each PU being assigned some prediction information. The Intra or Inter coding mode is assigned on the CU level as illustrated in FIG. 4 which shows an example of division of a Coding Tree Unit into Coding Units, Prediction Units and Transform Units. For coding a CU, a prediction block or prediction unit (PU) is built from neighboring reconstructed samples (intra prediction) or from previously reconstructed pictures stored in the Decoded Pictures Buffer (DPB) (inter-prediction). Next, the residual samples calculated as the difference between original samples and PU samples, are transformed and quantized.

In inter-prediction, motion compensated temporal prediction is employed to exploit the redundancy that exists between successive pictures of a video. To do so, a motion vector is associated to the PU and a reference index 0 (refIdx0) indicating which of a plurality of reference pictures listed in a list designated LIST_0 to use.

In HEVC, two modes are employed to encode the motion data. They are respectively called AMVP (Adaptive Motion Vector Prediction) and Merge. AMVP involves signaling the reference picture(s) used to predict current PU, the Motion Vector Predictor index (taken among a list of two predictors) and a motion vector difference. Merge mode comprises signaling and decoding the index of some motion data collected in a list of motion data predictors. The list is made of five candidates and is constructed the same way on the decoder and the on encode sides. Therefore, the merge mode aims at deriving some motion information taken from the merge list. The merge list typically contains the motion information associated to some spatial and temporal surrounding blocks, available in their decoded state when the current PU is being processed.

In other codecs such as, for example, that designated as the Joint Exploration Model (JEM) and that developed by JVET (Joint Video Exploration Team) group in the Versatile Video Coding (VVC) reference software known as VVC Test Model (VTM), some modes used in inter prediction (e.g., bi-directional inter prediction or B mode) can compensate for illumination changes with transmitted parameters. In the B mode a current block is associated with two motion vectors, designating two reference blocks in two different images. The predictor block allowing to compute the residual block for the current block is an average of two reference blocks. Several generalizations of bi-directional inter prediction were proposed in which the weights associated to each reference block are different. weighted prediction (WP) could be considered as a generalization of bi-directional inter predictions on some aspects. In WP, the residual block is computed as a difference between the current block and either a weighted version of a reference block in case of mono-directional inter prediction or a weighted average of two reference blocks in case of bi-directional inter prediction. WP could be enabled at the sequence level in a sequence header (called sequence parameter set (SPS) in VVC) or image level in an image header (called picture parameter set (PPS) in VVC). WP defines weights and offsets per group of CTU (e.g. generally at a slice header level) associated to each component of each reference picture of each list (L0 and L1) of reference images.

While WP is enabled in a sequence header (SPS) and in an image header (PPS) and the associated weights and offsets are specified in a slice header, a new mode called Bi prediction with CU-level weight (BCW), allows signalling weights at the block level.

Some additional temporal prediction tools with associated parameters determined at the decoder side, provide for features such as motion vector refinement and compensation for issues such as illumination variations. Such additional tools can include, for example, motion vector refinement such as Decoder side Motion Vector Refinement (DMVR), and illumination compensation such as Local Illumination Compensation (LIC). One purpose of DMVR can be to further refine motion vectors by using an approach to prediction such as bilateral matching prediction. One purpose of LIC can be to compensate for illumination change which may occur between a predicted block and its reference block employed through motion compensated temporal prediction. Both of these tools can involve, at least in part, a decoder-side process to derive parameters that are used for prediction.

Figure 5:
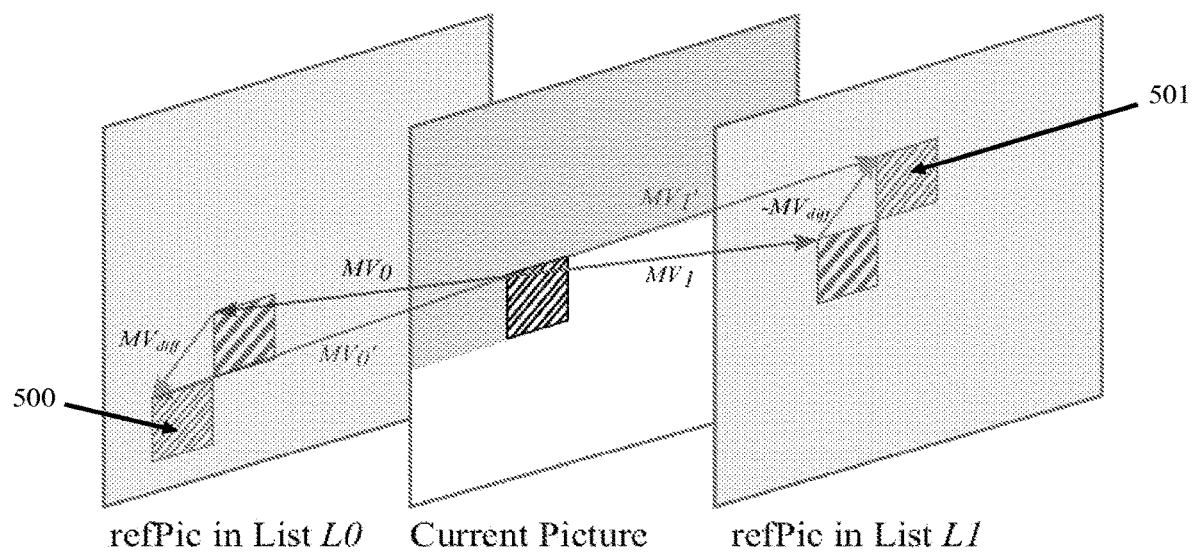
FIG. 5 illustrates an example of decoding side motion vector refinement (DMVR)

In more detail, an approach to increasing the accuracy of the MVs of the merge mode can involve applying a bilateral-matching (BM) based decoder side motion vector refinement. In bi-prediction operation, a refined MV is searched around the initial MVs in the reference picture list L0 and reference picture list L1. The BM method calculates the distortion between the two candidate Luma blocks in the reference picture list L0 and list L1 based on an approach such as Sum of Absolute Differences (SAD). As illustrated in the example of FIG. 5, the SAD between the blocks 500 and 501 (red blocks) is calculated based on each MV candidate around the initial MV. The MV candidate with the lowest SAD becomes the refined MV and used to generate the bi-predicted signal.

An approach to applying DMVR comprises where DMVR can be applied for the CUs which are coded with following modes:
CU level merge mode with bi-prediction MV;
One reference picture is in the past and another reference picture is in the future with respect to the current picture;
The distances (e.g., Picture Order Count (POC) difference) from both reference pictures to the current picture are the same;
CU has more than 64 luma samples and CU height is more than 8 luma samples.

The refined MV derived by DMVR process can be used to generate the inter prediction samples and also used in temporal motion vector prediction for future pictures coding while the original MV can be used, e.g., in deblocking process and also used in spatial motion vector prediction for future CU coding. Additional features of one or more approaches to DMVR are explained below.

As shown in the example illustrated in FIG. 5, the search points are surrounding the initial MV and the MV offset obey the MV difference mirroring rule. In other words, any points that are checked by DMVR, denoted by candidate MV pair (MV0, MV1) in FIG. 5, obey the following two equations:

$$MV0'=MV0+MV_{offset} \quad (1)$$

$$MV1'=MV1-MV_{offset} \quad (2)$$

Where $MV_{offset}$ represents the refinement offset between the initial MV and the refined MV in one of the reference pictures. The refinement search range can be, for example, two integer luma samples from the initial MV.

Figure 6:
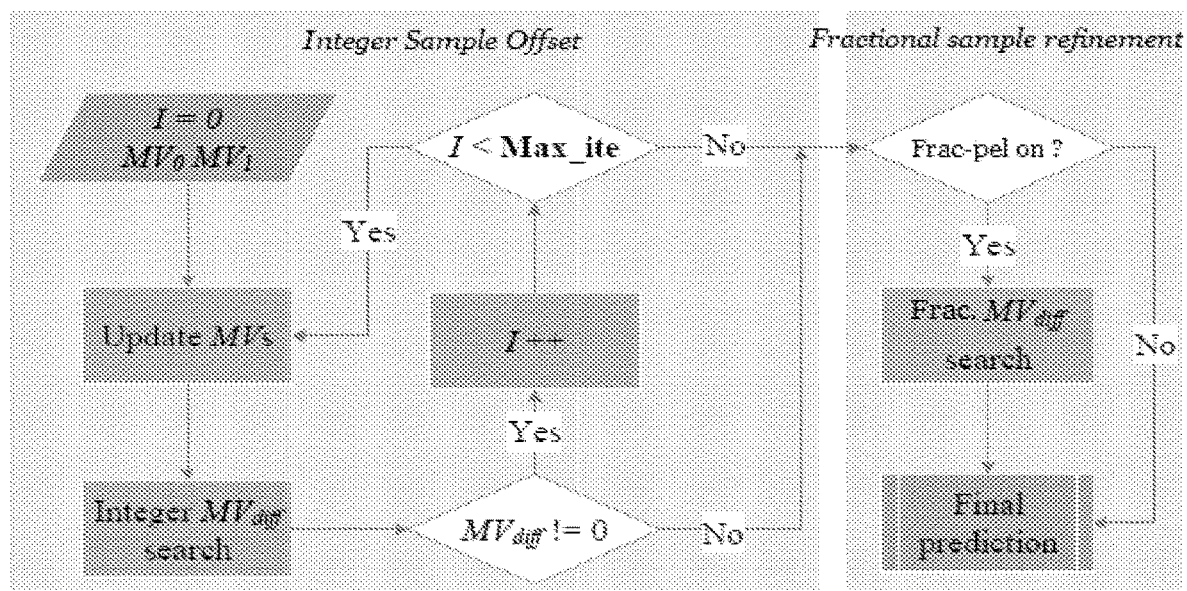
FIG. 6 provides a flow diagram illustrating an example of DMVR searching procedure.

FIG. 6 provides a flow diagram illustrating an example of the searching process of DMVR such as that illustrated in FIG. 5. As shown in the example of FIG. 6, the searching includes the integer sample offset search stage and fractional sample refinement stage.

Figure 7:
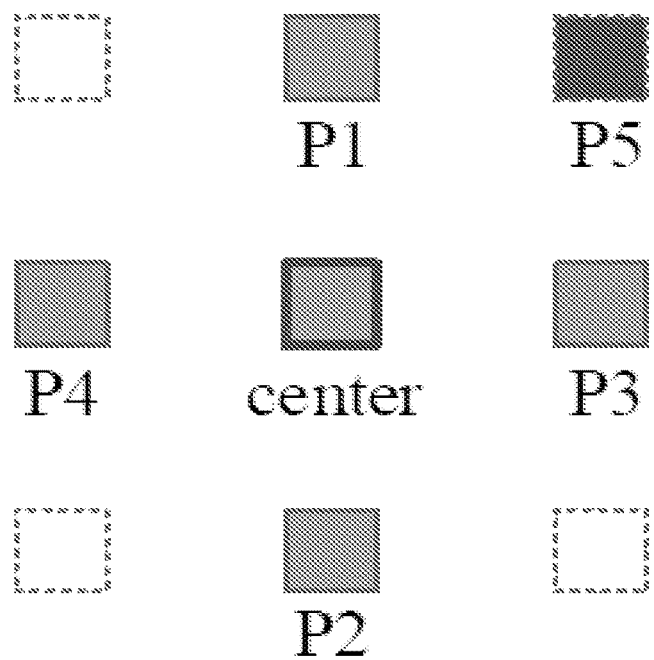
FIG. 7 illustrates an example of DMVR integer luma sample searching pattern.

To reduce the search complexity, a fast searching method with early termination mechanism can be applied in the integer sample offset search stage. Instead of a full search, e.g., 25 points, a two-iteration search scheme can be applied to reduce the SAD checking points. As shown in FIG. 7, a maximum of six SADs are checked in the first iteration. First, the SAD of the five points (Center and P1 through P4) are compared. If the SAD of the center position is smallest, the integer sample stage of DMVR is terminated. Otherwise one more position P5 (determined by the SAD distribution of P1 through P4) is checked. Then the position (among P1 through P5) with smallest SAD is selected as center position of the second iteration search. The process of the second iteration search is same to that of the first iteration search. The SAD calculated in the first iteration can be re-used in the second iteration, therefore only SAD of three additional points needs to be further calculated.

The integer sample search can be followed by fractional sample refinement. To reduce the calculation complexity, the fractional sample refinement can be derived by using parametric error surface equation, instead of additional search with SAD comparison. The fractional sample refinement can be conditionally invoked based on the output of the integer sample search stage. When the integer sample search stage is terminated with center having the smallest SAD in either the first iteration or the second iteration search, the fractional sample refinement is further applied.

In parametric error surface based sub-pixel offsets estimation, the center position cost and the costs at four neighboring positions from the center are used to fit a 2-D parabolic error surface equation of the following form:

$$E(x,y)=A(x-x_{min})^2+B(y-y_{min})^2+C \quad (3)$$

where (x_min, y_min) corresponds to the fractional position with the least cost and C corresponds to the minimum cost value. By solving the above equations using the cost value of the five search points, the (x_min, y_min) is computed as:

$$x_{min} = \frac{E(-1, 0) - E(1, 0)}{2(E(-1, 0) + E(1, 0) - 2E(0, 0))} \quad (4)$$

$$y\_min = (E(0, -1) - E(0, 1))/(2((E(0, -1) + E(0, 1) - 2E(0, 0))) \quad (5)$$

The value of $x_{min}$ d $y_{min}$ e automatically constrained to be between −8 and 8 since all cost values are positive and the smallest value is E (0,0). This corresponds, for example, to half pel offset with 1/16th-pel MV accuracy. The computed fractional (x_min, y_min) are added to the integer distance refinement MV to get the sub-pixel accurate refinement delta MV.

A codec can provide, for example, that the resolution of the MVs can be 1/16 luma samples. The samples at the fractional position are interpolated using an 8-tap interpolation filter. In DMVR, the search points are surrounding the initial fractional-pel MV with integer sample offset, therefore the samples of those fractional position need to be interpolated for DMVR search process. To reduce the calculation complexity, a bi-linear interpolation filter is used to generate the fractional samples for the searching process in DMVR. Another important effect is that by using bi-linear filter is that with two-sample search range, the DVMR does not access more reference samples compared to the normal motion compensation process. After the refined MV is attained with DMVR search process, the normal 8-tap interpolation filter is applied to generate the final prediction. In order to not access more reference samples to normal MC process, the samples, which is not needed for the interpolation process based on the original MV but is needed for the interpolation process based on the refined MV, will be padded from those available samples.

The maximum unit size for DMVR searching process can be limited, e.g., to 16×16. When the width and/or height of a CU are larger than the maximum size, e.g., larger than 16 luma samples, the CU can be further split into sub-blocks with width and/or height equal to, for example, the maximum size such as 16 luma samples.

Some modes used in inter prediction (or B mode) can compensate for illumination changes with transmitted parameters. In the B mode a current block is associated with two motion vectors, designating two reference blocks in two different images. The predictor block allowing to compute the residual block for the current block is an average of two reference blocks. The predictor biPred for the current block is computed as follows:

$$biPred = \frac{w_0 \cdot pred_0 + w_1 \cdot pred_1 + 1}{2}$$

where $pred_0$ is a motion compensated block predictor taken in a list L0 of reference images stored in a buffer of decoded images, called generally Decoded Picture Buffer (DPB); $pred_1$ is a motion compensated block predictor taken in a list L1 of reference images stored in the DPB; $w_0$ and $w_1$ are weights equal to one in the case of classical bi-directional inter prediction.

Several generalizations of bi-directional inter prediction were proposed in which the weights $w_0$ and $w_1$ are different. weighted prediction (WP) could be considered as a generalization of bi-directional inter predictions on some aspects. In WP, the residual block is computed as a difference between the current block and either a weighted version of a reference block in case of mono-directional inter prediction or a weighted average of two reference blocks in case of bi-directional inter prediction. WP could be enabled at the sequence level in a sequence header (called sequence parameter set (SPS) in VVC) or image level in an image header (called picture parameter set (PPS) in VVC). WP defines weights $w_i$ and offsets $off_i$ per group of CTU (e.g. generally at a slice header level) associated to each component of each reference picture i of each list (L0 and L1) of reference images stored in the DPB. If a current block is coded in bi-directional WP, the prediction sample pred(x,y) at position (x,y) for the current block is computed as follows:

$$pred(x,y)=((w_0 \cdot pred_0(x,y)+w_1 \cdot pred_1(x,y)+Off_{01}) >> (shift+1))\text{with } Off_{01}=(Off_0+Off_1+1)<<shift$$

where $pred_i$ (x, y) is a motion compensated predictor sample taken in the list $L_i$ of reference images stored in the DPB and spatially corresponding to pred(x,y), $w_i$ is a weight, $Off_i$ is an offset value.

In order to keep increased numerical precision when weighting samples, one can store and operate intermediate sample values with increased bit-depth precision. In this case, the final (desired) bit-depth sample prediction precision (bitDepth) is obtained with a last right bit-shift at the end of the prediction computation process. For example, the reference pictures in the DPB are stored at the precision bitDepth, but intermediate motion compensated samples are stored at increased precision (bitDepth+sp) in intermediate buffers. One objective of the shift value shift in the two preceding equations is to insure this intermediate increase bit-depth precision. Note that similar intermediate bit-depth precision increase processes are generally used for all prediction tools using a sample weighting process.

While WP is enabled in a sequence header (SPS) and in an image header (PPS) and the associated weights and offsets are specified in a slice header, a new mode called Bi prediction with CU-level weight (BCW), allows signalling weights at the block level. When the BCW mode is applied to a current block, a predictor sample pred(x,y) for the current block is computed as follows:

$$pred(x,y)=((8-w) \cdot pred_0(x,y)+w \cdot pred_1(x,y)+4)>>3$$

where $pred_0$(x, y) is a motion compensated predictor sample taken in the list L0 of reference images stored in the DPB and spatially corresponding to pred(x,y), $pred_1$(x,y) is a motion compensated predictor sample taken in the list L1 of reference images stored in the DPB and spatially corresponding to pred(x, y), and w is a weight taken in a set of five weights (w ∈ {−2, 3, 4, 5, 10}). The weight w is determined in one of two ways: 1) for a non-merge CU, a weight index bcw_idx is signalled after the motion vector difference; 2) for a merge CU, the weight index bcw_idx is inferred from neighbouring blocks based on the merge candidate index.

The use of a tool such as illumination compensation, e.g., local illumination compensation (LIC), can be signaled on the CU level such as through a flag (LIC flag) associated to each coding unit (CU) coded in inter mode. When this tool is activated, the decoder computes some prediction parameters based on some reconstructed picture samples, localized on the left and/or on the top of the current block to be predicted and reference picture samples localized on the left and/or on the top of the motion compensated block as illustrated by the examples shown in FIG. 8. In the following, the set of samples composed of both the samples situated on the row above the current block and the samples situated on the column at the left of the current block will be referred to as "L-shape" associated to the current block. For example, in FIG. 8, one example of the L-shape includes the small squares above and to the left of the current block.

LIC can be based on a linear model having parameters corresponding, for example, to weight and offset and designated (a,b). Parameters (a,b) can be determined, for example, based on the minimization of an error, or local distortion, distance "dist", between current samples and linearly modified reference samples, which can defined as follows (Eq. 6):

$$dist = \sum_{r \in Vcur, s \in Vref} (rec_{cur(r)} - a * rec_{ref(s)} - b)^2$$

where:
rec_cur(r) is a neighboring reconstructed sample in current picture (illustrated by the examples on the right side of FIG. 8);
rec_ref(s) is a reference sample built with motion compensation (MC) from reference picture (illustrated by the examples on the left side of FIG. 8), with s=r+mv;
rec_cur(r) and rec_ref(s) are co-located samples in the reconstructed and reference L-shape respectively.

In some implementations, additional limitations may be imposed in the choice of the reconstructed and reference samples used in the L-shape. For instance, one may impose the reconstructed samples belongs to neighboring blocks are not coded in intra mode, or not coded with prediction built with intra mode (e.g. CIIP).

The value of (a,b) can be obtained using a least square minimization as follows (Eq. 7):

$$a = \left( \frac{\sum ref(s) \times cur(r) - \frac{\sum ref(s) \times \sum cur(r)}{N}}{\sum cur(r)^2 - \frac{\sum ref(s) \times \sum ref(s)}{N}} \right)$$

$$b = \frac{\sum cur(r)}{N} - a \times \frac{\sum ref(s)}{N}$$

Note that the value of N may be further adjusted (reduced incrementally) in order to the sum terms in Eq. 7 to remain below the maximum integer storage number value allowed (e.g. $N < 2^{16}$). Also, the sub-sampling of the top and left samples set can be incremented for large blocks.

Once the LIC parameters are obtained by the encoder or the decoder for the current CU, then the prediction pred(current_block) of current CU comprises for an example case such as uni-directional prediction:

$$pred(current\_block) = a \times ref\_block + b \quad (8)$$

Where current_block is the current block to predict, pred(current_block) is the prediction of the current block, and ref_block is the reference block built with regular motion compensation (MC) process and used for the temporal prediction of the current block.

Note that the set of neighboring reconstructed and the set of reference samples (samples illustrated by small, square blocks in FIG. 8) have the same number and same pattern. In the following, "left samples" will denote the set of neighboring reconstructed samples (or the set of reference samples) situated immediately to the left of the current block and "top samples" will denote the set of neighboring reconstructed samples (or the set of reference samples) located immediately above (or adjacent to) the top of the current block. A "samples set" will denote a combination of one of each of "left samples" and "top-samples" sets.

Figure 9:
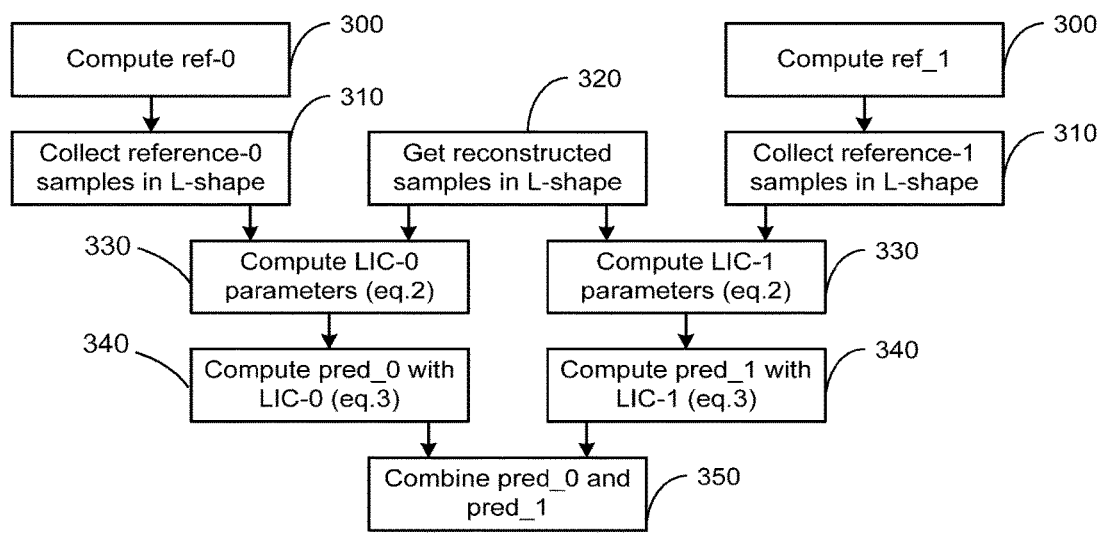
FIG. 9 provides a flow diagram illustrating an example of derivation of LIC parameters and application for each prediction L0 and L1.

In the case of bi-prediction, the LIC process can be applied twice as illustrated by the example shown in FIG. 9. In FIG. 9, the LIC process is applied on both reference 0 prediction (LIST-0) and reference 1 prediction (LIST_1) as illustrated by 300 through 340 in FIG. 9. Next, the two predictions are combined together at 350 in FIG. 9 using, for example, default weighting (P=(P0+P1+1)>>1) or bi-prediction weighted averaged (BPWA): P=(g0.P0+g1.P1+(1<<(s−1)))>>s). This method will be referred to as "method-a".

Figure 10:
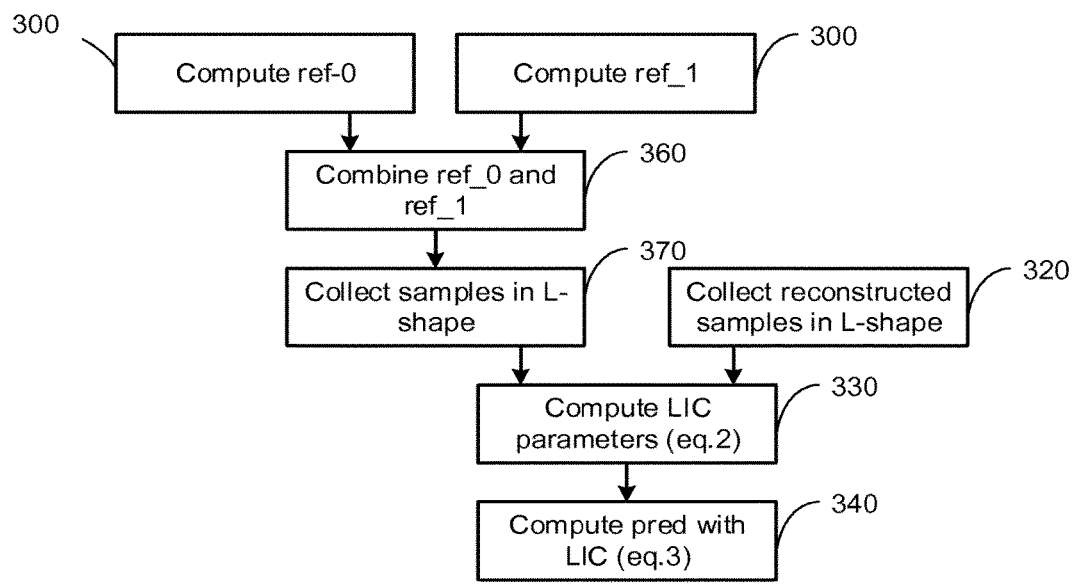
FIG. 10 provides a flow diagram illustrating an example of derivation of LIC parameters and application to the combined prediction from L0 and L1.
Figure 11:
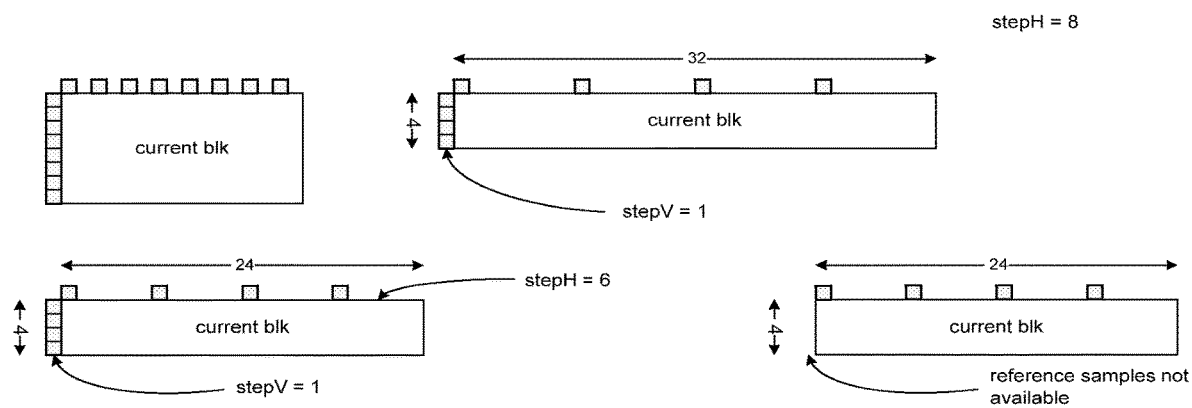
FIG. 11 illustrates examples of the position of left and top reference samples for rectangular CUs.

In an example of another embodiment referred to herein as "method-b" and illustrated in FIG. 10, in case of bi-prediction, the two predictions are determined at 300, i.e., reference 0 and reference 1 predictions, and then combined at 360 before applying a single LIC process at 320, 330, 340 and 370 in FIG. 10.

In an example of another embodiment herein referred to as "method-c" (method-c based on method-b), in case of bi-prediction, the LIC-0 and LIC-1 parameters are derived directly such as, e.g.:

$$dist = \Sigma_{e \in Vcur, s \in Vref}(rec_{cur(r)} - a0.rec_{ref0(s)} - a1. rec_{ref1(s)} - b)^2 \quad (9)$$

Figure 8:
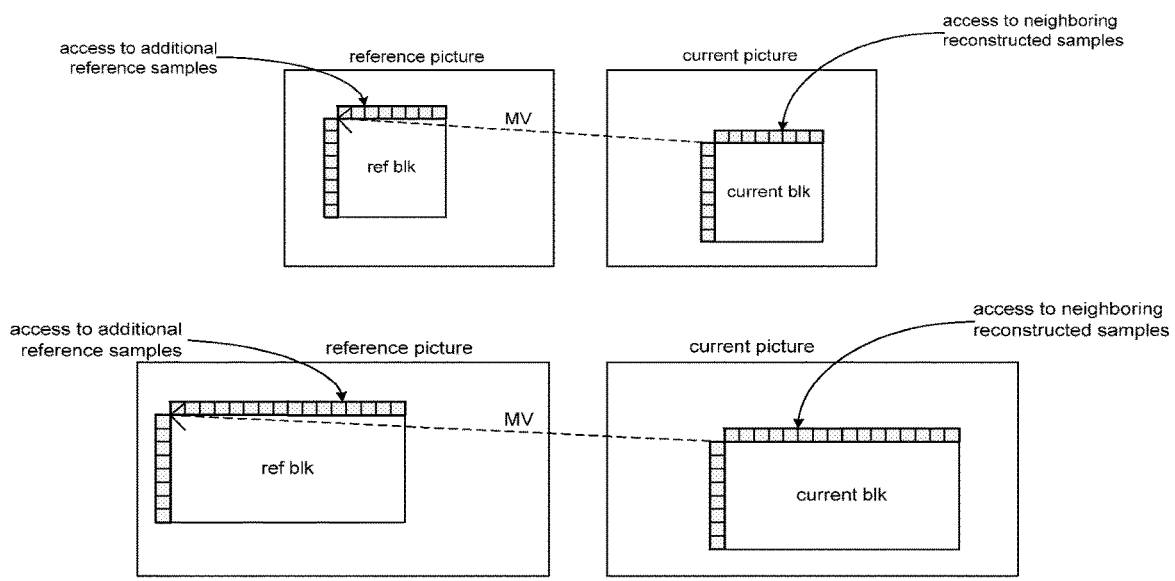
FIG. 8 illustrates an example of illumination compensation parameters, e.g., local illumination compensation (LIC) parameters, being derived from neighboring reconstructed samples and the corresponding reference samples translated with motion vectors (MV) for both square CU (upper illustration) and rectangular CU (lower illustration)

Some restrictions can be applied in the choice of the left and top samples shown in FIG. 8 that are used to derive the LIC parameters. For example, restrictions can be one or more of:
1) The sum of left and top samples number should be a power of 2 so that the division is implemented using right shifting
2) The number of left (NL) and top (NT) samples is the same and is equal to Ns (N=2.Ns):

n=min(cuHeight,cuWidth)

x=log2(n)

$$Ns = 2^x \quad (10)$$

3) The step in between left (stepV) or top (stepH) samples is equal to:

stepV=cuHeight>>log2(Ns)

stepH=cuWidth>>log2(Ns) (11)

In general, LIC, WP, BCW and DMVR as described above are separate tools. However, these tools may be combined in various ways. In accordance with an aspect of the present disclosure, combining these tools may involve adaptations of at least one of these tools to obtain improved or optimal performance. For example, an embodiment illustrated in FIG. 16 can involve determining at 1610 whether a motion vector refinement such as that provided by a DMVR tool is activated. If not (negative or "no" result at 1610), processing such as encoding or decoding of video or picture data continues at 1640. If there is a positive result at 1610 ("yes" result at 1610), then at 1620 there is a determination of whether a second process is activated (e.g., LIC, WP or BCW). If not ("no" result at 1620), then processing continues at 1640. If the result at 1620 is positive (e.g., "yes") then processing continues at 1630 where, as a result of the combination of tools being activated, the motion vector refinement process is modified or adapted as described below.

Figure 16:
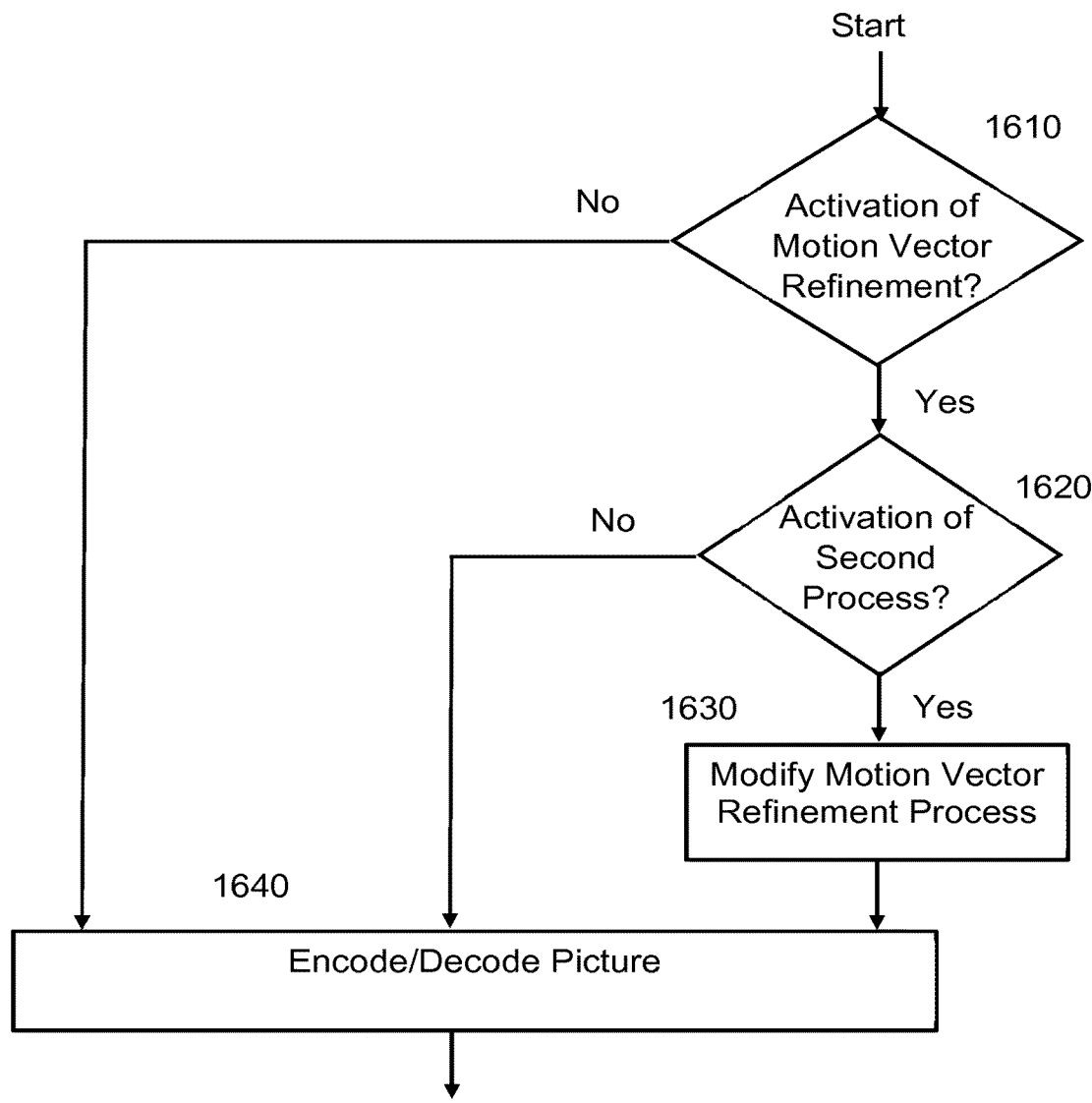
FIG. 16 through FIG. 19 provide flow diagrams illustrating various examples of embodiments in accordance with the present disclosure.
Figure 17:
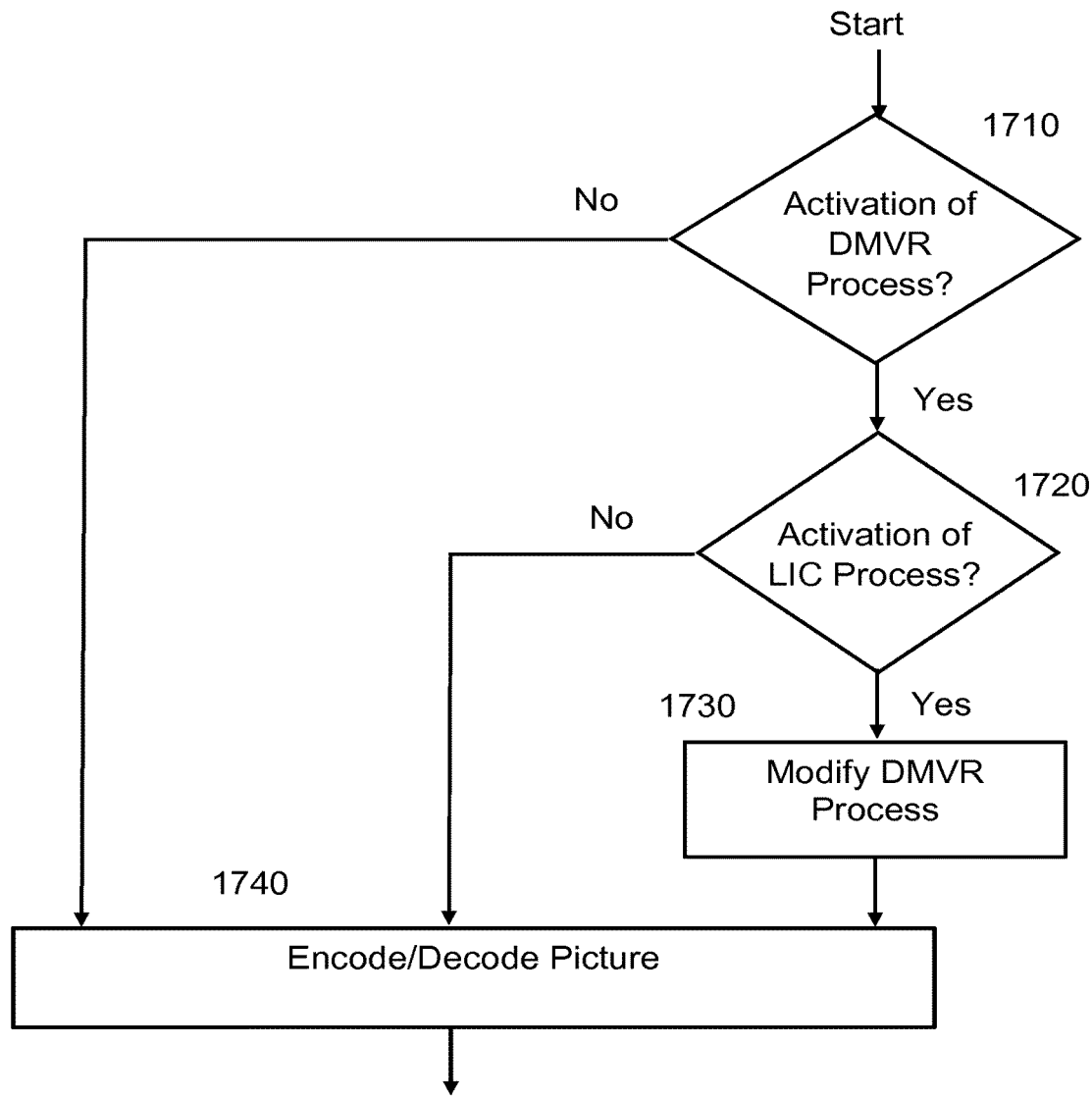

FIG. 17 illustrates another example of an embodiment that is a variant of the embodiment illustrated in FIG. 16. In FIG. 17, activation of DMVR is determined at 1710 followed by determination of activation of LIC at 1720. Otherwise, features of the embodiment illustrated in FIG. 17 are similar to those described above with regard to the embodiment of FIG. 16 and will not be described again.

As mentioned above, an aspect of the present disclosure can involve adaptations of at least one of the described tools to obtain improved or optimal performance when combining tools such as those described herein. For example, the Sum of Absolute Difference (SAD) approach used to derive the DMVR predictor might not be suited to application of a tool such as LIC, WP, or BCW in combination with DMVR. For example, LIC or WP or BCW can correct some defaults that the DMVR process might already reduce or attempt to minimize with the SAD function. An encoder may apply a motion vector search algorithm using a cost determination approach or function other than, different from or modified with respect to a function such as SAD. For example, a function such a modified form of SAD such as Mean-Removed SAD (MRSAD) may be applied when LIC or WP or BCW is activated in an effort to optimize the motion search for what LIC or WP or BCW will not be able to correct, i.e., optimize the result of the combination of MOTION+(LIC or WP or BCW). However, using DMVR with SAD after a motion search using MRSAD can be non-optimal and, potentially, even counterproductive. One approach to addressing such issues can be to prevent or forbid the combination of these tools, e.g., when LIC or WP or BCW is ON, then DMVR is not allowed. However, doing so is likely undesirable or not optimal, as the benefit of DMVR is not provided.

In general, one aspect of the present disclosure can involve improving motion vector refinement such as DMVR if illumination compensation such as LIC or WP or BCW is activated. At least one embodiment can involve, instead of using the Sum of Absolute Values (SAD) in the DMVR derivation process, using the Mean Removed Sum of Absolute Values (MRSAD) when LIC or WP or BCW is activated in combination with DMVR. Once the DMVR prediction is available, the LIC process is computed.

Figure 12:
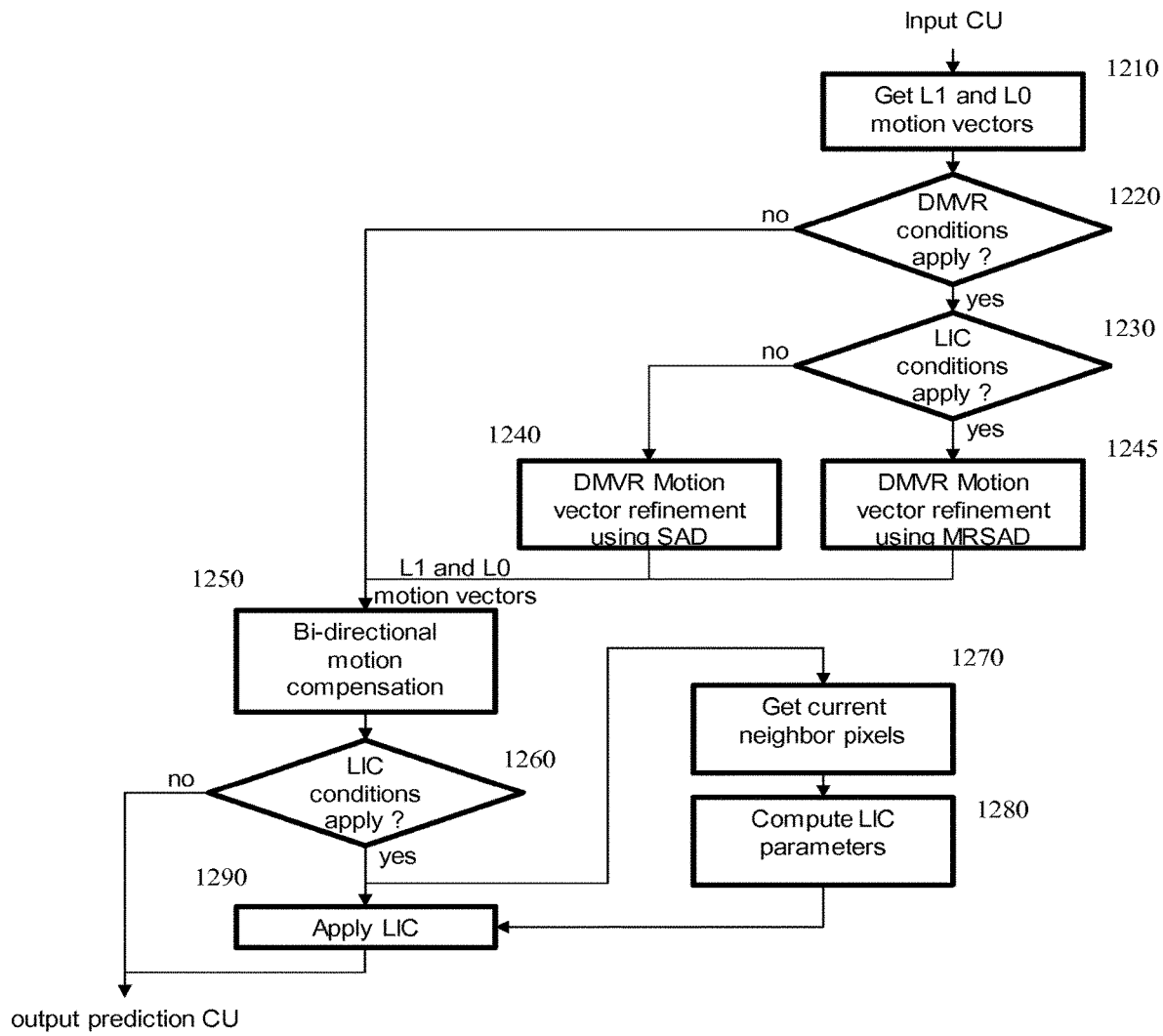
FIG. 12 provides a flow diagram illustrating an example of bi-prediction with DMVR and LIC.

In accordance with an aspect of the present disclosure, in general at least one embodiment can involve use of MRSAD in the DMVR derivation process when LIC or WP or BCW is activated. For example, an embodiment of a bi-prediction process is depicted in FIG. 12. In FIG. 12, at 1210 the input to the process is the pair of the motion vectors for L0 and L1 reference lists. If at 1220 it is determined that DMVR is not applied, a "usual" bi-prediction process is applied at 1250 followed by the application of LIC process at 1260 if LIC is enabled or activated. If it is determined at 1220 that DMVR is applied, then its application depends at 1230 on the LIC condition. Instead of LIC, WP or BCW values can also be used as condition. If LIC is not applied, DMVR is derived at 1240 using SAD as described above, followed by the bi-prediction at 1250 with refined motion vectors. If LIC is applied as determined at 1230 then DMVR is applied using MRSAD as the cost function at 1245 followed by motion compensation at 1250.

Application of MRSAD can occur as shown in FIG. 7. That is, first the MRSAD of the five points (Center and P1~P4) are compared. If the MRSAD of the center position is smallest, the integer sample stage of DMVR is terminated. Otherwise one more position P5 is checked. Then the position with smallest MRSAD is selected as center position of the second iteration search. The process of the second iteration search is same to that of the first iteration search. The MRSAD calculated in the first iteration can be re-used in the second iteration, therefore only MRSAD of three additional points needs to be further calculated. As before, the integer sample search is followed by fractional sample refinement using parametric error surface equation of the MRSAD values.

The MRSAD between two blocks of same size first eliminates a constant offset between the two blocks before computing a difference between those two blocks. It is different from the Sum of Absolute Difference (SAD) where a constant change between two blocks can impact a lot the difference. The aim of the MRSAD is to be more robust to illumination changes. In our case, this is relevant to use this measure because the LIC or WP or BCW process will correct illumination changes. The mean difference D between two blocks B1 and B2 is first computed as:

$$D = \frac{1}{N} * \sum_{i \in B} B1(i) - B2(i) \qquad (12)$$

where i is a block pixel coordinate belonging to B, and N the number of pixels in the block.

The MRSAD is then computed by accumulating absolute differences of the block pixels minus the average difference:

$$MRSAD = \frac{1}{N} * \sum_{i \in B} |B1(i) - B2(i) - D| \qquad (13)$$

Figure 13:
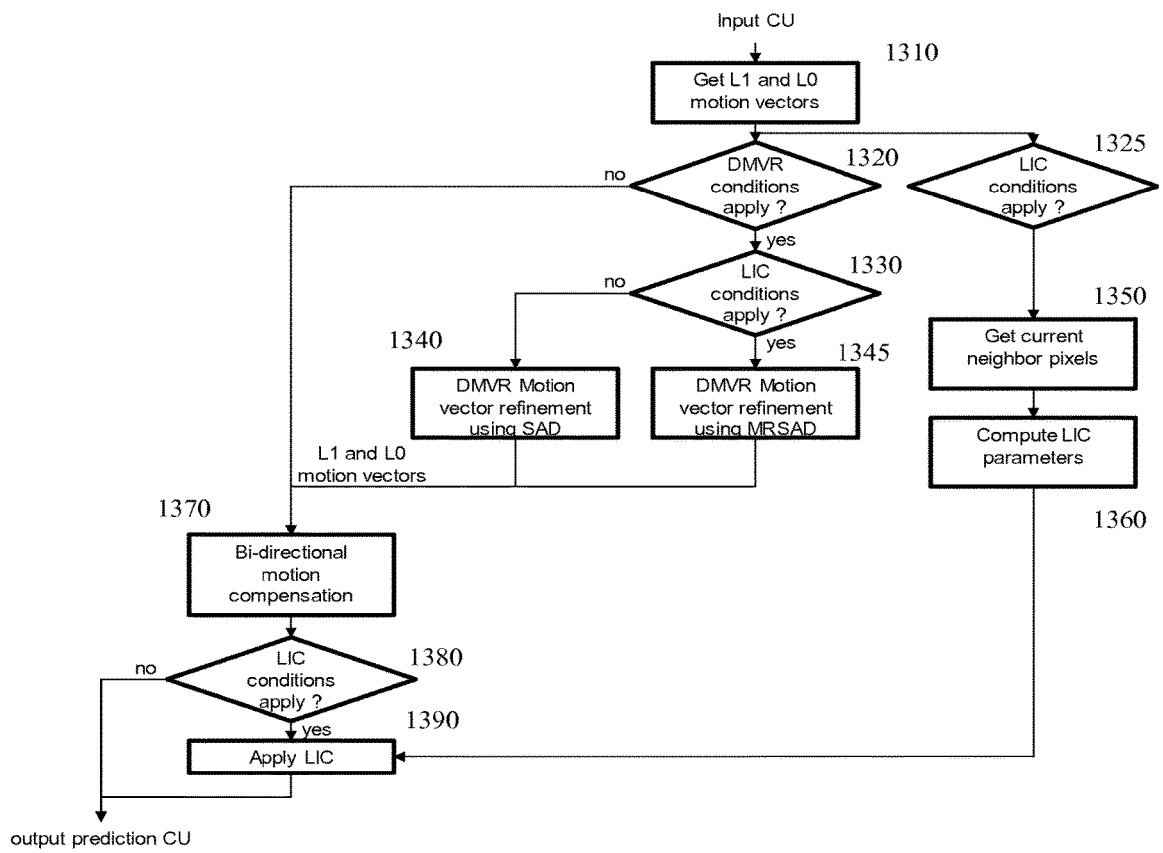
FIG. 13 provides a flow diagram illustrating an example of derivation of LIC parameters based on the decoded bi-prediction motion vectors before DMVR refinement.

In general, an example of at least one embodiment can involve the LIC parameters being computed before or in parallel with the DMVR process, as illustrated by the example shown in FIG. 13. In FIG. 13, following obtaining the input of the two motion vectors at 1310, the LIC parameters are determined at 1325, 1350 and 1360 while the DMVR process proceeds at 1320, 1330, 1340, 1345, 1370 and 1380. The LIC parameters produced at 1360 are provided to 1390 where LIC is applied if activated or enabled. An embodiment such as the example in FIG. 13 enables computing the LIC parameters in parallel with the DMVR process. Doing so may improve efficiency of operation and/or improving performance, reducing cost, etc.

In general, another example of at least one embodiment can involve the block average difference D being computed only for the first position at the first iteration of DMVR process and reused for the neighboring ones. Doing so may enable avoiding the computation of average block difference for each tested position, thereby potentially improving efficiency of operation and/or improving performance, reducing cost, etc.

Figure 15:
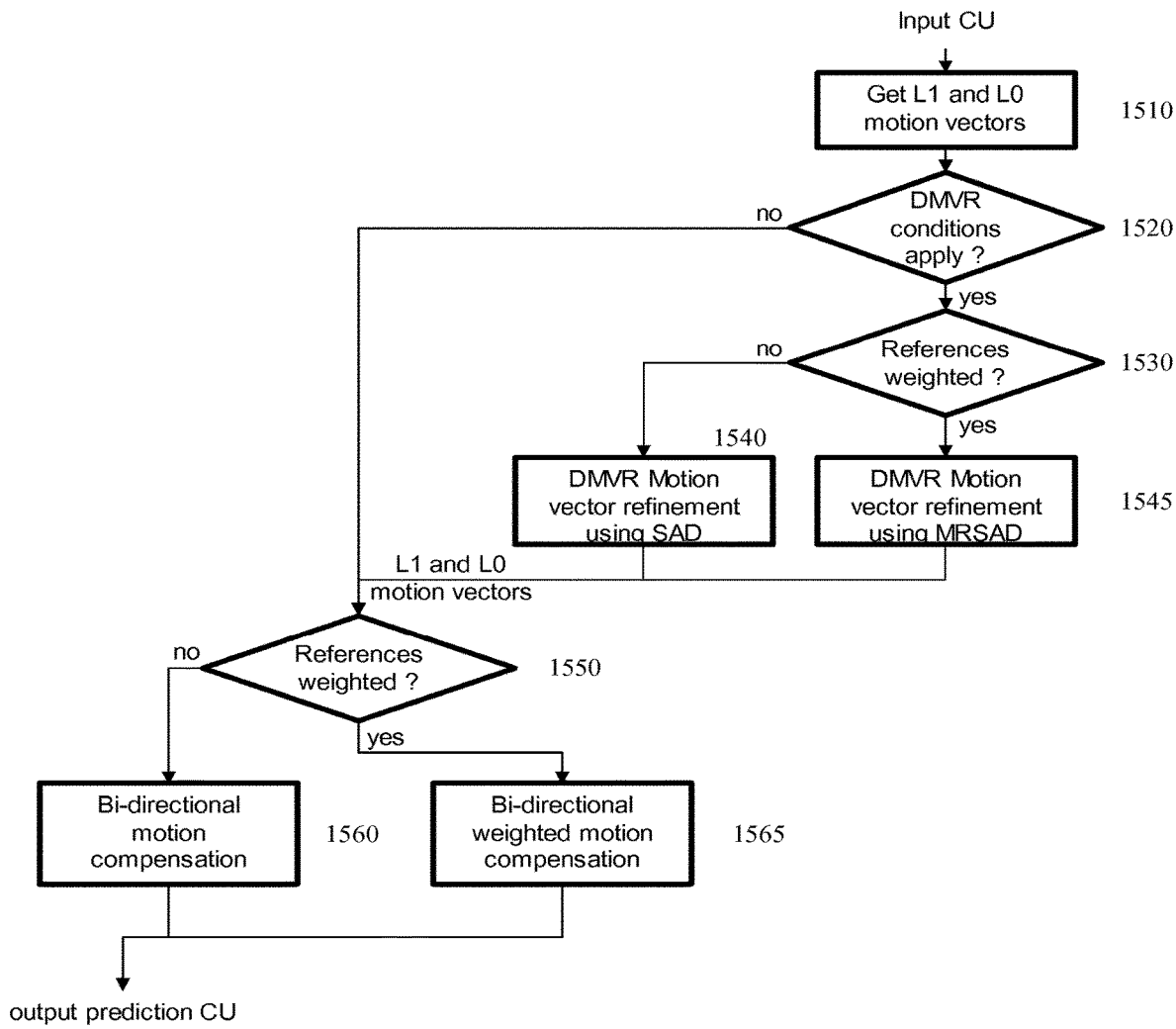
FIG. 15 provides a flow diagram illustrating an example of an embodiment involving bi-prediction with motion vector refinement such as DMVR and weighted prediction (WP)

Another example of an embodiment is illustrated in FIG. 15. The example of FIG. involves motion vector refinement such as DMVR with a tool such as WP as described above. In FIG. 15, at 1510 the input to the process is the pair of the motion vectors for L0 and L1 reference lists. If at 1520 it is determined that motion vector refinement, e.g., DMVR, is not applied ("no" at 1520) then at 1550 a determination is made regarding whether the references are weighted. If so ("yes" at 1550) then bi-directional weighted motion compensation occurs at 1565 and the prediction CU is output. If the references are not weighted ("no" at 1550) then a "usual" bi-prediction motion compensation is applied at 1560 followed by output of the resulting prediction CU. If it is determined at 1520 that motion vector refinement, e.g., DMVR, is applied ("yes" at 1520) then its application depends at 1530 on whether the references are weighted such as with WP. If weighted ("yes" at 1530) then motion vector refinement is derived at 1545 based on using MRSAD as described above followed by operation continuing at 1550 as described above. If it is determined at 1530 that references are not weighted ("no" at 1530) then motion vector refinement is derived at 1540 using SAD as described above, followed by operation continuing at 1550 as described above.

Figure 18:
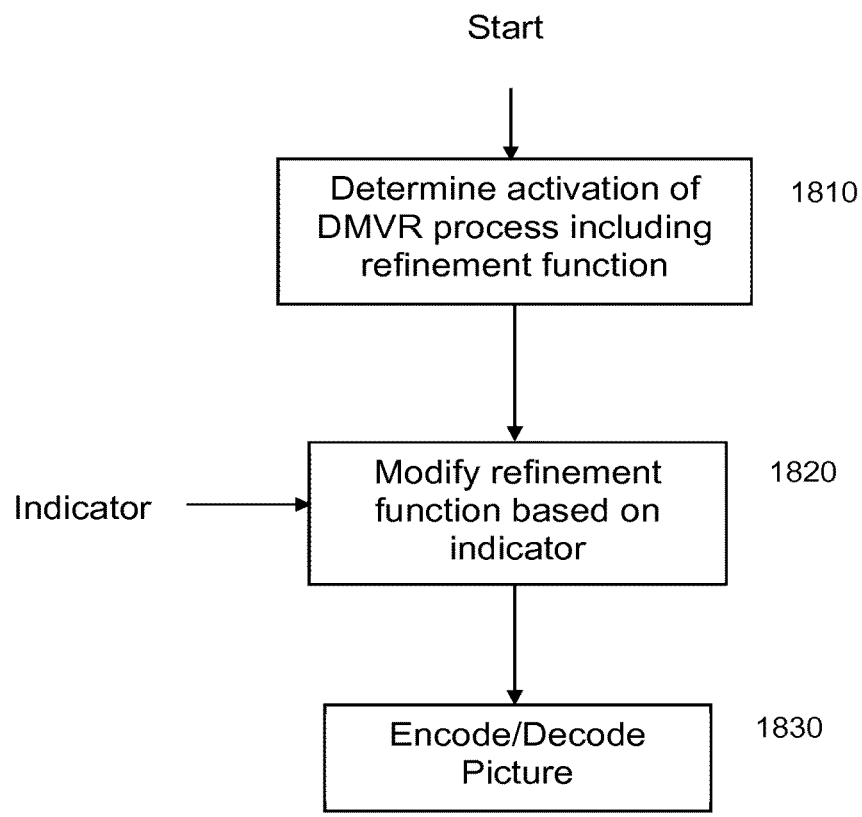

More generally, at least one other example of an embodiment can involve motion vector refinement, e.g., DMVR process, being modified or adapted based on an indicator, e.g., information, or a flag, or an index, being encoded/decoded in the bitstream or inferred (for example, as in previous embodiments, if LIC is on the flag is inferred to true). An example of such an embodiment is illustrated in FIG. 18. In FIG. 18, at 1810 determination of activation of a decoder-side motion vector refinement, DMVR, occurs. A DMVR process may include a refinement function such as SAD as described above. If at 1810 it is determined that a DMVR process is activated then at 1820 a refinement function may be modified based on an indicator, e.g., information or a flag or an index. For example, the indicator may indicate to modify the refinement function to MRSAD rather than SAD such as when a LIC tool is activated as described above. Alternatively, the indicator can indicate which of one or more tools such as LIC, WP and BCW is activated along with DMVR where the combination of tools results in modification of the refinement function as described above, e.g., selecting MRSAD rather than SAD as the refinement function. Following 1820, picture information is encoded/decoded based on the DMVR process including the modified refinement function.

Figure 19:
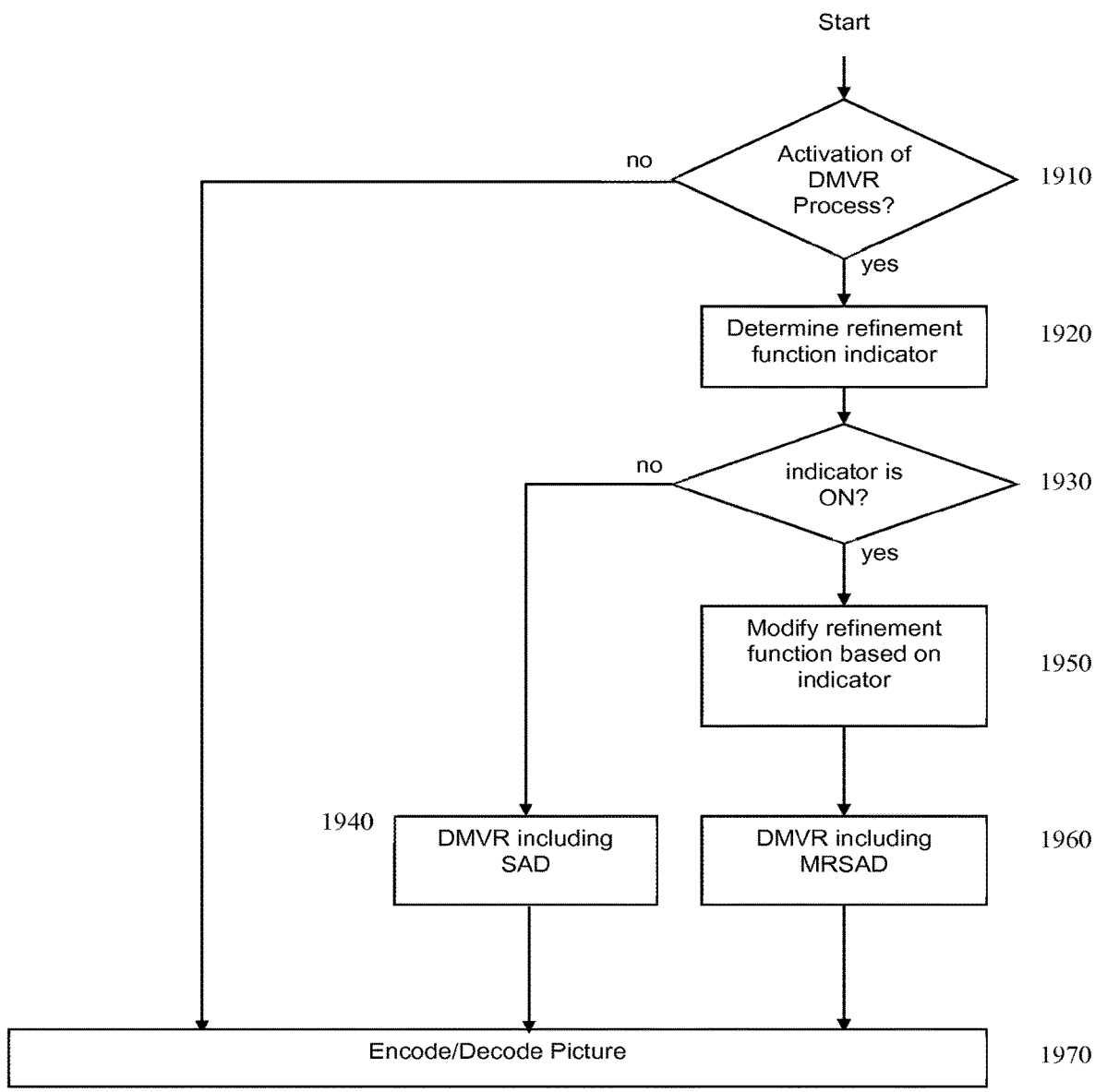

FIG. 19 illustrates another example of an embodiment that is a variant of the embodiment shown in FIG. 18. In FIG. 19, operation at 1910 determines whether a DMVR process such as that provided by a DMVR tool is activated. If DMVR is not activated (negative or "no" result at 1910), processing such as encoding or decoding of video or picture data continues at 1970. If there is a positive result at 1910 ("yes" result at 1910), then a DMVR process is activated. As described above, a DMVR process may include a refinement function such as SAD. At 1920, an indicator as described above with regard to FIG. 18 is determined (inferred or read from bitstream/determined by the encoder) where the indicator indicates whether a refinement function, e.g., SAD, is modified or adapted. The indicator value is tested at 1930. If the result is negative ("no" result at 1930), then processing continues at 1940 where the DMVR process including a refinement function such as SAD proceeds. If the result at 1930 is positive (e.g., "yes") then processing continues at 1950 where the refinement function is modified based on the indicator, e.g., selected to be MRSAD. In a variant, the indicator can be a function index that has a plurality of values mapped to a corresponding plurality of functions that can be selected to modify or adapt a refinement function included in a DMVR process. In the example of FIG. 19, the index equal to 0 can indicate or correspond to selection of a refinement function of SAD while the index equal to 1 can indicate or correspond to selection of a refinement function of MRSAD. The selection of refinement function based on the indicator or index modifies the refinement function. Then, at 1960, the DMVR process occurs including the modified refinement function. At 1970, picture information is encoded/decoded based on the DMVR process including the modified refinement function.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

In general, the examples of embodiments described and contemplated in this document can be implemented in many different forms. FIGS. 1 and 2 described above and FIG. 14 described below provide some embodiments, but other embodiments are contemplated and the discussion of FIGS. 1, 2 and 14 does not limit the breadth of the implementations. At least one embodiment generally provides an example related to video encoding and/or decoding, and at least one other embodiment generally relates to transmitting a bitstream or signal generated or encoded. These and other embodiments can be implemented as a method, an apparatus, a computer readable storage medium having stored thereon instructions for encoding or decoding video data according to any of the methods described, and/or a computer readable storage medium having stored thereon a bitstream or signal generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this document can be used to modify modules of a video encoder and/or decoder such as motion compensation and/or motion estimation modules 170 and 175 of encoder 100 shown in FIG. 1 and motion compensation module 275 of decoder 200 shown in FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this document can be used individually or in combination.

Various numeric values are used in the present document, for example. The specific values are for example purposes and the aspects described are not limited to these specific values.

Figure 14:
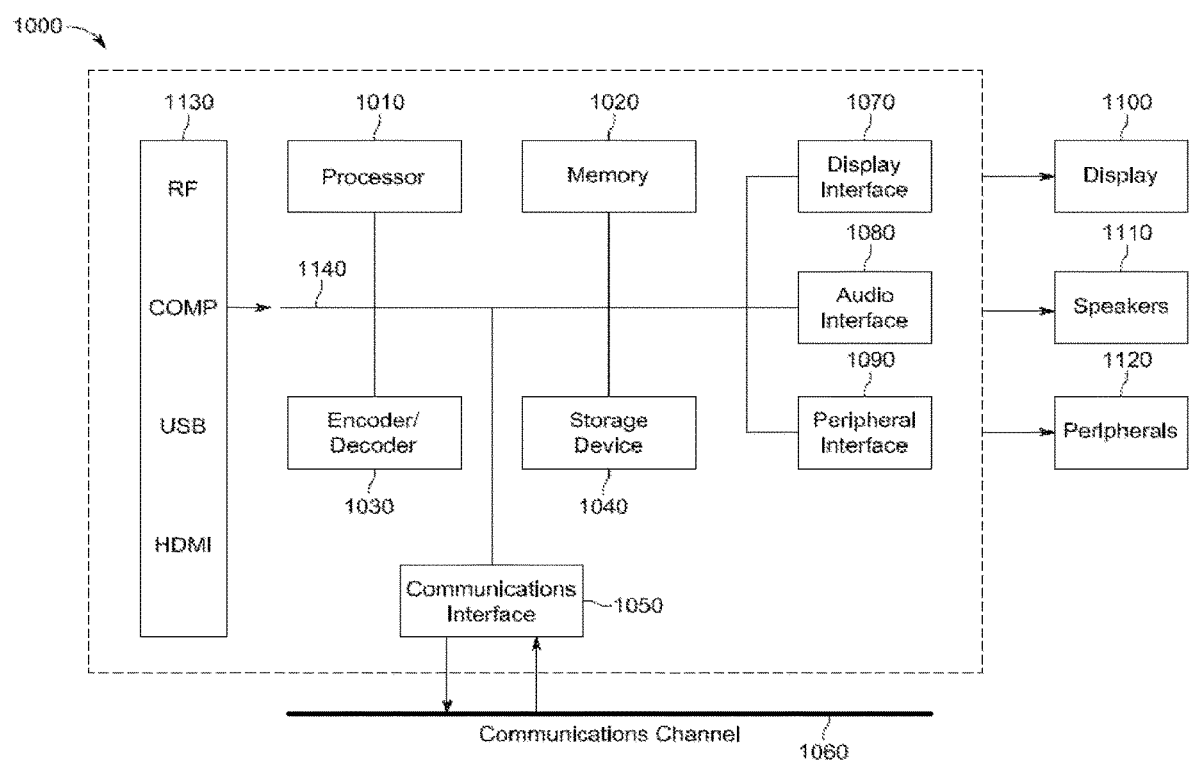
FIG. 14 provides a block diagram illustrating an example of an embodiment of apparatus in accordance with various aspects described herein.

FIG. 14 illustrates a block diagram of an example of a system in which various aspects and embodiments can be implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or anon-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various generalized as well as particularized embodiments are also supported and contemplated throughout this disclosure. Examples of embodiments in accordance with the present disclosure include but are not limited to the following.

In general, at least one example of an embodiment can involve a method for encoding picture information, comprising: determining activation of a decoder-side motion vector refinement process including a refinement function; modifying the refinement function based on an indicator; and encoding at least a portion of the picture information based on the decoder-side motion vector refinement process and the modified refinement function.

In general, at least one example of an embodiment can involve a method for decoding picture information, comprising: determining activation of a decoder-side motion vector refinement process including a refinement function; modifying the refinement function based on an indicator; and decoding at least a portion of the picture information based on the decoder-side motion vector refinement process and the modified refinement function.

In general, at least one example of an embodiment can involve apparatus for encoding picture information, comprising: one or more processors configured to determine activation of a decoder-side motion vector refinement process including a refinement function; modify the refinement function based on an indicator; and encode at least a portion of the picture information based on the decoder-side motion vector refinement process and the modified refinement function.

In general, at least one example of an embodiment can involve apparatus for decoding picture information, comprising: one or more processors configured to determine activation of a decoder-side motion vector refinement process including a refinement function; modify the refinement function based on an indicator; and encode at least a portion of the picture information based on the decoder-side motion vector refinement process and the modified refinement function.

In general, at least one example of an embodiment can involve a method as described herein, wherein modifying a refinement function comprises modifying a cost function associated with a decoder-side motion vector refinement process.

In general, at least one example of an embodiment can involve apparatus as described herein, wherein one or more processors being configured to modify a refinement function comprises the one or more processors being configured to modify a cost function associated with a decoder-side motion vector refinement process.

In general, at least one example of an embodiment can involve a method as described herein, wherein modifying a cost function comprises using a mean removed sum of absolute differences (MRSAD) cost function during a decoder-side motion vector refinement process.

In general, at least one example of an embodiment can involve apparatus as described herein, wherein one or more processors being configured to modify a cost function comprises the one or more processors being configured to use a mean removed sum of absolute differences (MRSAD) cost function during a decoder-side motion vector refinement process.

In general, at least one example of an embodiment can involve a method as described herein, wherein a refinement function comprises a cost function; and modifying the refinement function comprises selecting the cost function from a group comprising a sum of absolute differences (SAD) cost function and a mean removed sum of absolute differences (MRSAD) cost function.

In general, at least one example of an embodiment can involve apparatus as described herein, wherein a refinement function comprises a cost function; and one or more processors being configured to modify the refinement function comprises the one or more processors being configured to select the cost function from a group comprising a sum of absolute differences (SAD) cost function and a mean removed sum of absolute differences (MRSAD) cost function.

In general, at least one example of an embodiment can involve a method or apparatus as described herein, wherein an indicator comprises one or more of an information or an index or a flag indicating activation of at least one of a local illumination compensation (LIC) process, or a weighted prediction process (WP), or a bi-prediction with coding unit (CU)-level weight (BCW) process during activation of the decoder-side motion vector refinement process.

In general, at least one example of an embodiment can involve a method for encoding a picture comprising: determining an activation of a processing mode involving a motion vector refinement process and a second process other than the motion vector refinement process; modifying the motion vector refinement process based on the activation and the second process; and encoding the picture based on the modified motion vector refinement process and the second process.

In general, at least one example of an embodiment can involve a method for decoding a picture comprising: determining an activation of a processing mode involving a motion vector refinement process and a second process other than the motion vector refinement process; modifying the motion vector refinement process based on the activation and the second process; and decoding the picture based on the modified motion vector refinement process and the second process.

In general, at least one example of an embodiment can involve an apparatus for encoding a picture, comprising one or more processors, wherein the one or more processors are configured to: determine an activation of a processing mode involving a motion vector refinement process and a second process other than the motion vector refinement process; modify the motion vector refinement process based on the activation and the second process; and encode the picture based on the modified motion vector refinement process and the second process.

In general, at least one example of an embodiment can involve an apparatus for decoding a picture, comprising one or more processors, wherein the one or more processors are configured to: determine an activation of a processing mode involving a motion vector refinement process and a second process other than the motion vector refinement process; modify the motion vector refinement process based on the activation and the second process; and decode the picture based on the modified motion vector refinement process and the second process.

In general, at least one example of an embodiment can involve a method or apparatus including a motion vector refinement process as described herein, wherein the motion vector refinement process comprises a decode-side motion vector refinement process (DMVR).

In general, at least one example of an embodiment can involve a method or apparatus including a second process as described herein, wherein the second process comprises at least one of a local illumination compensation (LIC) process, or a weighted prediction process (WP), or a bi-prediction with coding unit (CU)-level weight (BCW).

In general, at least one example of an embodiment can involve a method including modifying a motion vector refinement process as described herein, wherein modifying the motion vector refinement process comprises modifying a cost function associated with the motion vector refinement process.

In general, at least one example of an embodiment can involve an apparatus including one or more processors being configured to modify a motion vector refinement process as described herein, wherein the one or more processors being configured to modify a motion vector refinement process comprises the one or more processors being configured to modify a cost function associated with the motion vector refinement process.

In general, at least one example of an embodiment can involve a method including modifying a cost function associated with a motion vector refinement process as described herein, wherein modifying the cost function comprises using a mean removed sum of absolute differences (MRSAD) cost function during the motion vector refinement process.

In general, at least one example of an embodiment can involve an apparatus including one or more processors configured to modify a cost function associated with a motion vector refinement process as described herein, wherein the one or more processors being configured to modify a cost function comprises using a mean removed sum of absolute differences (MRSAD) cost function during the motion vector refinement process.

In general, at least one example of an embodiment can involve a method for encoding a picture, comprising: determining an activation of a processing mode involving a decoder side motion vector refinement (DMVR) process and a local illumination compensation (LIC) process; modifying the DMVR process based on the activation and the LIC process; and encoding the picture based on the modified DMVR process and the LIC process.

In general, at least one example of an embodiment can involve a method for decoding a picture, comprising: determining an activation of a processing mode involving a decoder side motion vector refinement (DMVR) process and a local illumination compensation (LIC) process; modifying the DMVR process based on the activation and the LIC process; and decoding the picture based on the modified DMVR process and the LIC process.

In general, at least one example of an embodiment can involve an apparatus for encoding a picture, comprising one or more processors, wherein the one or more processors are configured to: determine an activation of a processing mode involving a decoder side motion vector refinement (DMVR) process and a local illumination compensation (LIC) process; modify the DMVR process based on the activation and the LIC process; and encode the picture based on the modified DMVR process and the LIC process.

In general, at least one example of an embodiment can involve an apparatus for decoding a picture, comprising one or more processors, wherein the one or more processors are configured to: determine an activation of a processing mode involving a decoder side motion vector refinement (DMVR) process and a local illumination compensation (LIC) process; modify the DMVR process based on the activation and the LIC process; and decode the picture based on the modified DMVR process and the LIC process.

In general, at least one example of an embodiment can involve a method including modifying a DMVR process as described herein, wherein modifying the DMVR process comprises modifying a cost function associated with the DMVR process.

In general, at least one example of an embodiment can involve an apparatus comprising one or more processors configured to modify a DMVR process as described herein, wherein the one or more processors being configured to modify the DMVR process comprises the one or more processors being configured to modify a cost function associated with the motion vector refinement process.

In general, at least one example of an embodiment can involve a method including modifying a cost function associated with a DMVR process as described herein, wherein modifying the cost function comprises using a mean removed sum of absolute differences (MRSAD) cost function during the DMVR process.

In general, at least one example of an embodiment can involve an apparatus comprising one or more processors configured to modify a cost function associated with a DMVR process as described herein, wherein the one or more processors being configured to modify the cost function associated with the DMVR process comprises the one or more processors being configured to use a mean removed sum of absolute differences (MRSAD) cost function during the DMVR process.

In general, at least one example of an embodiment can involve a computer program product including instructions, which, when executed by a computer, cause the computer to carry out any one or more of the methods described herein.

In general, at least one example of an embodiment can involve a non-transitory computer readable medium storing executable program instructions to cause a computer executing the instructions to perform any one or more of the methods described herein.

In general, at least one example of an embodiment can involve a signal comprising data generated according to any one or more of the methods described herein.

In general, at least one example of an embodiment can involve a bitstream, formatted to include syntax elements and encoded image information in accordance with any one or more of the methods described herein.

In general, at least one example of an embodiment can involve a device comprising an apparatus according to any embodiment of apparatus as described herein, and at least one of (i) an antenna configured to receive a signal, the signal including data representative of the image information, (ii) a band limiter configured to limit the received signal to a band of frequencies that includes the data representative of the image information, and (iii) a display configured to display an image from the image information.

In general, at least one example of an embodiment can involve a device as described herein, wherein the device comprises one of a television, a television signal receiver, a set-top box, a gateway device, a mobile device, a cell phone, a tablet, or other electronic device.

Throughout this disclosure, various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, extracting a picture from a tiled (packed) picture, determining an upsample filter to use and then upsampling a picture, and flipping a picture back to its intended orientation.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Also, various implementations involve encoding. In an analogous way to the above discussion about "decoding", "encoding" as used in this application can encompass all or part of the processes performed, for example, on an input video sequence in order to produce an encoded bitstream or signal. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches can be based on an extensive testing of all encoding options, including all considered modes or coding parameters values, with a complete evaluation of their coding cost and related distortion of the reconstructed signal after coding and decoding. Faster approaches can also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various embodiments have been described. Embodiments may include any of the following features or entities, alone or in any combination, across various different claim categories and types:

Providing in an encoder and/or decoder for encoding/decoding picture information based on determining activation of a decoder-side motion vector refinement process including a refinement function, wherein the refinement function is modified based on an indicator.

Providing in an encoder and/or decoder for encoding/decoding picture information based on determining activation of a decoder-side motion vector refinement process including a refinement function, wherein the refinement function is modified based on an indicator, and including one or more of the refinement function comprises a cost function, or modifying the refinement function comprises modifying the cost function associated with the decoder-side motion vector refinement process, or modifying the cost function comprises using a mean removed sum of absolute differences (MRSAD) cost function during the decoder-side motion vector refinement process, or modifying the refinement function comprises selecting the cost function from a group comprising a sum of absolute differences (SAD) cost function and a mean removed sum of absolute differences (MRSAD) cost function, or the indicator comprises one or more of an information or an index or a flag indicating activation of at least one of a local illumination compensation (LIC) process, or a weighted prediction process (WP), or a bi-prediction with coding unit (CU)-level weight (BCW) process during activation of the decoder-side motion vector refinement process.

Providing in the encoder and/or decoder for applying a motion vector refinement when an illumination compensation is activated.

Providing in the encoder and/or decoder for applying a decoder-side motion vector refinement (DMVR) when a local illumination compensation (LIC) is activated.

Providing in the encoder and/or decoder for applying a motion vector refinement based on a modified cost function when an illumination compensation is activated.

Providing in the encoder and/or decoder for applying a decoder-side motion vector refinement (DMVR) when a weighted prediction (WP) is activated.

Providing in the encoder and/or decoder for applying a motion vector refinement based on a modified cost function when a WP is activated.

Providing in the encoder and/or decoder for applying a decoder-side motion vector refinement (DMVR) when a bi-prediction with CU-level weight (BCW) is activated.

Providing in the encoder and/or decoder for applying a motion vector refinement based on a modified cost function when a BCW is activated.

Providing in the encoder and/or decoder for applying a decoder-side motion vector refinement (DMVR) based on a modified cost function when a local illumination compensation (LIC) or WP or BCW is activated.

Providing in the encoder and/or decoder for applying a motion vector refinement based on a modified sum of absolute difference (SAD) cost function when an illumination compensation (e.g., LIC or WP or BCW) is activated.

Providing in the encoder and/or decoder for applying a motion vector refinement based on a modified sum of absolute difference (SAD) cost function when an illumination compensation is activated, wherein the motion vector refinement comprises a decoder side motion vector refinement (DMVR), and the modified sum of absolute difference cost function comprises a mean-removed SAD (MRSAD), and the illumination compensation comprises a local illumination compensation (LIC) or WP or BCW.

Providing in the encoder and/or decoder for applying a decoder-side motion vector refinement (DMVR) when a local illumination compensation (LIC) is activated, wherein once the DMVR prediction is available then the LIC process is computed.

Providing in the encoder and/or decoder for applying a decoder-side motion vector refinement (DMVR) based on whether a local illumination compensation (LIC) or WP or BCW is activated, wherein the DMVR being applied comprises applying a modified cost function when LIC or WP or BCW is activated.

Providing in the encoder and/or decoder for applying a decoder-side motion vector refinement (DMVR) based on whether a local illumination compensation (LIC) or WP or BCW is activated, wherein the DMVR being applied comprises applying a modified cost function when LIC or WP or BCW is activated, and the modified cost function comprises a mean removed sum of absolute difference cost function.

Providing in the encoder and/or decoder for applying a decoder-side motion vector refinement (DMVR) based on the value of a flag/index coded in the bitstream at CU, Slice, SPS, PPS level, wherein the DMVR being applied comprises applying a modified cost function depending on the value of the coded information, and the modified cost function comprises a mean removed sum of absolute difference cost function.

Providing in the encoder and/or decoder for applying a motion vector refinement when an illumination compensation is activated based on providing an improved compression efficiency.

Inserting in the signaling syntax elements that enable the encoder and/or decoder to provide for applying a motion vector refinement when an illumination compensation is activated as described herein.

Selecting, based on these syntax elements, the combination of motion vector refinement and illumination compensation to apply at the decoder.

A bitstream or signal that includes one or more of the described syntax elements, or variations thereof.

Inserting in the signaling syntax elements that enable the decoder to provide motion vector refinement and illumination compensation in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that provides for applying a motion vector refinement and an illumination compensation according to any of the embodiments described.

A TV, set-top box, cell phone, tablet, or other electronic device that performs motion vector refinement and illumination compensation according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded image, and performs motion vector refinement and illumination compensation according to any of the embodiments described.

A TV, set-top box, cell phone, tablet, or other electronic device that receives (e.g. using an antenna) a signal over the air that includes an encoded image, and performs motion vector refinement and illumination compensation according to any of the embodiments described.

A computer program product storing program code that, when executed by a computer implements motion vector refinement and illumination compensation in accordance with any of the embodiments described.

A non-transitory computer readable medium including executable program instructions causing a computer executing the instructions to implement motion vector refinement and illumination compensation in accordance with any of the embodiments described.

Various other generalized, as well as particularized embodiments are also supported and contemplated throughout this disclosure.

The invention claimed is:

1. A method for decoding a picture, the method comprising:
   determining whether decoder side motion vector refinement (DMVR) and local illumination compensation (LIC) are activated for a current block of the picture; and
   based on a determination that DMVR and LIC are activated for the current block:
      determining one or more LIC parameters associated with decoding the current block;
      refining one or more motion vectors associated with the current block; and
      decoding the current block of the picture based on the one or more LIC parameters and the one or more refined motion vectors;
      wherein the one or more LIC parameters are determined before or during the refinement of the one or more motion vectors.

2. The method of claim 1, wherein the one or more LIC parameters include a weight and an offset to be applied to a reference block of the current block.

3. The method of claim 1, wherein the determination of the one or more LIC parameters is performed in parallel with the refinement of the one or more motion vectors.

4. The method of claim 1, wherein the one or more motion vectors are refined based at least on a mean removed sum of absolute differences (MRSAD) cost function.

5. The method of claim 4, wherein refining the one or more motion vectors comprises calculating a constant offset for a first search point associated with the decoding of the current block and reusing the constant offset for a second search point associated with the decoding of the current block.

6. A video decoding device, comprising:
   a processor configured to:
   determine whether decoder side motion vector refinement (DMVR) and local illumination compensation (LIC) are activated for a current block of a picture; and
   based on a determination that DMVR and LIC are activated for the current block:
      determine one or more LIC parameters associated with decoding the current block;
      refine one or more motion vectors associated with the current block; and
      decode the current block of the picture based on the one or more LIC parameters and the one or more refined motion vectors;
      wherein the one or more LIC parameters are determined before or during the refinement of the one or more motion vectors.

7. The video decoding device of claim 6, wherein the one or more LIC parameters include a weight and an offset to be applied to a reference block of the current block.

8. The video decoding device of claim 6, wherein the processor is configured to determine the one or more LIC parameters in parallel with refining the one or more motion vectors.

9. The video decoding device of claim 6, wherein the one or more motion vectors are refined based at least on a mean removed sum of absolute differences (MRSAD) cost function.

10. The video decoding device of claim 9, wherein the processor being configured to refine the one or more motion vectors comprises the processor being configured to calculate a constant offset for a first search point associated with the decoding of the current block and reuse the constant offset for a second search point associated with the decoding of the current block.

11. A method for encoding a picture, the method comprising:
    determining whether decoder side motion vector refinement (DMVR) and local illumination compensation (LIC) are activated for a current block of the picture; and
    based on a determination that DMVR and LIC are activated for the current block:
       determining one or more LIC parameters associated with decoding the current block;
       refining one or more motion vectors associated with the current block; and
       encoding the current block of the picture based on the one or more LIC parameters and the one or more refined motion vectors;
       wherein the one or more LIC parameters are determined before or during the refinement of the one or more motion vectors.

12. The method of claim 11, wherein the one or more LIC parameters include a weight and an offset to be applied to a reference block of the current block.

13. The method of claim 11, wherein the determination of the one or more LIC parameters is performed in parallel with the refinement of the one or more motion vectors.

14. The method of claim 11, wherein the one or more motion vectors are refined based at least on a mean removed sum of absolute differences (MRSAD) cost function.

15. The method of claim 14, wherein refining the one or more motion vectors comprises calculating a constant offset for a first search point associated with the encoding of the current block and reusing the constant offset for a second search point associated with the encoding of the current block.

16. A video encoding device, comprising:
    a processor configured to:
    determine whether decoder side motion vector refinement (DMVR) and local illumination compensation (LIC) are activated for a current block of a picture; and
    based on a determination that DMVR and LIC are activated for the current block:
       determine one or more LIC parameters associated with decoding the current block;
       refine one or more motion vectors associated with the current block; and
       encode the current block of the picture based on the one or more LIC parameters and the one or more refined motion vectors;
       wherein the one or more LIC parameters are determined before or during the refinement of the one or more motion vectors.

17. The video encoding device of claim 16, wherein the one or more LIC parameters include a weight and an offset to be applied to a reference block of the current block.

18. The video encoding device of claim 16, wherein the processor is configured to determine the one or more LIC parameters in parallel with refining the one or more motion vectors.

19. The video encoding device of claim 16, wherein the one or more motion vectors are refined based at least on a mean removed sum of absolute differences (MRSAD) cost function.

20. The video encoding device of claim 19, wherein the processor being configured to refine the one or more motion vectors comprises the processor being configured to calculate a constant offset for a first search point associated with the encoding of the current block and reuse the constant offset for a second search point associated with the encoding of the current block.

* * * * *